United States Patent [19]

Johansson et al.

[11] Patent Number: 5,229,068

[45] Date of Patent: Jul. 20, 1993

[54] OPTIMIZED CRITICAL POWER IN A FUEL BUNDLE WITH PART LENGTH RODS

[75] Inventors: Eric B. Johansson, Wrightsville Beach, N.C.; Bruce Matzner, San Jose, Calif.; Gary E. Dix, Saratoga, Calif.; Richard A. Wolters, Jr., San Jose, Calif.; Anthony P. Reese, San Jose, Calif.

[73] Assignee: General Electric Company, San Jose, Calif.

[21] Appl. No.: 914,389

[22] Filed: Jul. 15, 1992

Related U.S. Application Data

[63] Continuation-in-part of Ser. No. 701,931, May 17, 1991, abandoned, and a continuation-in-part of Ser. No. 702,644, May 17, 1991, abandoned.

[51] Int. Cl.⁵ ............................................. G21C 15/00
[52] U.S. Cl. ....................................... 376/371; 396/439; 396/443; 396/377
[58] Field of Search ............... 376/439, 443, 444, 371, 376/377, 373; 976/DIG. 60, DIG. 76, DIG. 78, DIG. 33

[56] References Cited

U.S. PATENT DOCUMENTS

| | | | |
|---|---|---|---|
| 3,243,351 | 3/1966 | Campbell et al. | 376/371 |
| 4,292,128 | 9/1981 | Takeda et al. | 376/370 |
| 4,357,209 | 11/1982 | Wolters, Jr. et al. | 376/441 |
| 4,357,298 | 11/1982 | Wolters | 376/441 |
| 4,675,154 | 6/1987 | Nelson et al. | 376/444 |
| 4,734,249 | 3/1988 | Utamura et al. | 376/214 |
| 4,863,680 | 9/1989 | Sakurada et al. | 376/444 |
| 4,876,063 | 10/1989 | Johansson | 376/444 |
| 4,913,875 | 4/1990 | Johansson et al. | 376/439 |
| 4,970,047 | 11/1990 | Ueda et al. | 376/443 |
| 5,032,351 | 6/1991 | Johansson | 376/438 |
| 5,112,570 | 5/1992 | Dix et al. | 376/370 |

OTHER PUBLICATIONS

Westinghouse Vantage 5 PWR Nuclear Fuel Assembly S. L. Davidson, Ed., Apr. 1988.

*Primary Examiner*—Donald P. Walsh
*Assistant Examiner*—Meena Chelliah
*Attorney, Agent, or Firm*—Robert P. Schroeder

[57] ABSTRACT

In a fuel bundle for use in the core of a boiling water nuclear reactor, part length rods having a tendency to reduce pressure drop are used in combination with spacers and spacer attached devices tending to restore pressure drop to improve critical power. The addition of the part length rods has the advantage of lowering the pressure drop. Attached devices substantially recapture the pressure drop. Exemplary spacer attached mechanisms for the recapture of pressure drop are set forth including vanes—preferably swirl vanes on the spacers, decreasing the spacer pitch to increase the total number of spacers in the upper two phase region of the fuel bundle, increasing the vertical height of the spacers, and increasing the thickness of the metal from which the spacers are constructed. Two classes of separation devices are disclosed for placement in the volume overlying the end of the partial length fuel rods. A first type of device fits to the end of the part length rods and is primarily intended for preventing water passing along the surface of the part length rod adjacent the end of the part length rod from entering the volume overlying the part length fuel rod. A second type of device resides in the volume overlying the part length rod. In either case, critical power is improved.

71 Claims, 19 Drawing Sheets

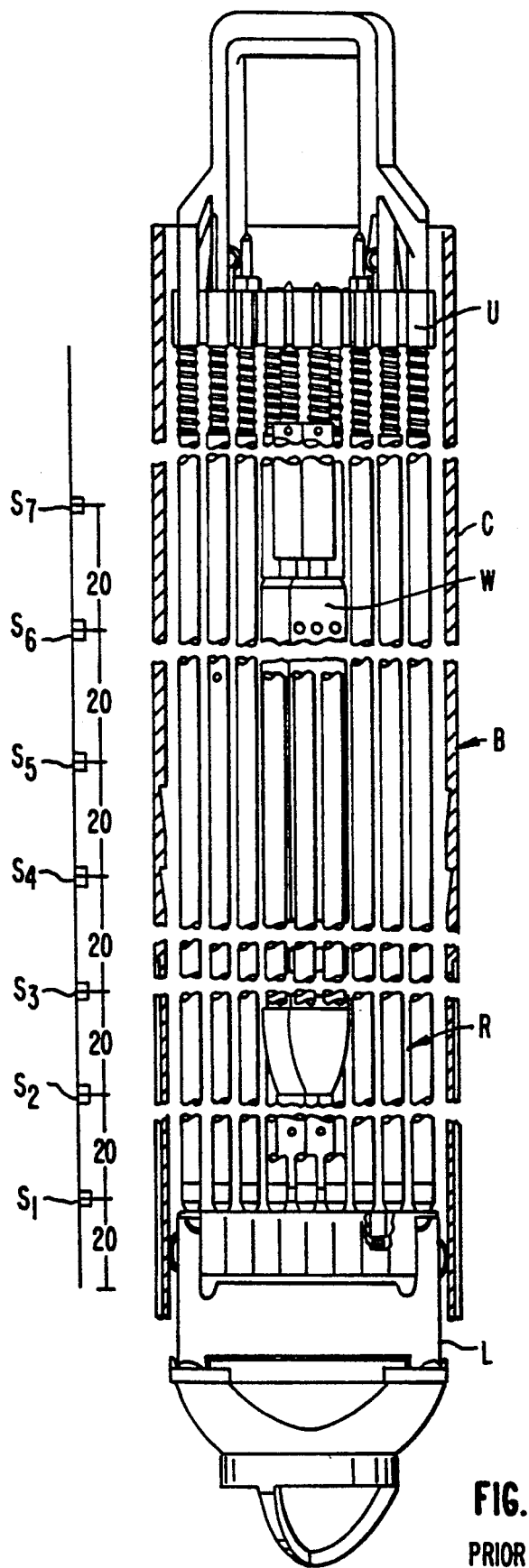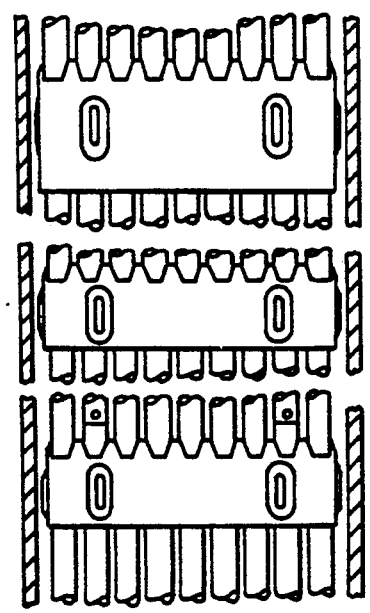
FIG. 8.
FIG. 1.
PRIOR ART

F - FULL LENGTH ROD
S - SWIRL VANE ABOVE PLR
W - WATER ROD

OPTIMIZED CRITICAL POWER IN A FUEL BUNDLE WITH PART LENGTH RODS

This application is a continuation-in-part of Matzner et al. patent application Ser. No. 07/701,931, filed May 17, 1991 entitled OPTIMIZED SPACER ASSOCIATE DROP IN A BWR BUNDLE HAVING PART LENGTH RODS, now abandoned and Dix patent application Ser. No. 07/702,644, filed May 17, 1991 entitled SEPARATION DEVICES WITH PART LENGTH RODS, now abandoned.

This invention relates to nuclear fuel bundles utilized in boiling water nuclear reactors having part length rods. More particularly, the combination of a fuel bundle having part length rods is disclosed wherein pressure reduction obtained by the introduction of part length rods in the upper two phase region of a fuel assembly is reclaimed by the introduction of spacers causing substantial recapture of the reduced pressure drop. Improved critical power results.

For example, spacer pitch can be changed to add spacers to the upper two phase region of the fuel bundle. Alternately, so-called vanes, especially swirl vanes can be added. Other expedients are introduced for causing pressure drop with the spacers including increased spacer height and constructing the spacers of thicker metallic materials.

This invention also includes the addition of separation devices overlying the part length rods.

BACKGROUND OF THE INVENTION

In Dix et al. U.S. Pat. No. 5,112,570 issued May 12, 1992, entitled TWO-PHASE PRESSURE DROP REDUCTION BWR ASSEMBLY DESIGN (formerly U.S. patent application Ser. No. 07/176,975 filed Apr. 4, 1988), a fuel bundle having a plurality of part length rods was illustrated. A summary of that construction and the advantages set forth in this reference can be instructive.

Construction of the fuel bundle in Dix et al. is conventional with the exception of the addition of less than full length fuel rods. The conventional portion of the disclosed fuel assembly in the Dix et al. Patent is easy to understand. This assembly includes a channel having vertically extending walls for extending around a fuel bundle assembly volume. The channel is open at the bottom for receipt of water moderator and open at the top for the discharge of water and steam. The fuel bundle includes a matrix of vertically upstanding fuel rods—these rods being sealed tubes containing fissionable materials. The fuel rods are supported on a lower tie plate which permits the entry of the water moderator to the fuel bundle. The fuel rods typically extend to an upper tie plate which maintains the fuel rods in their side by side vertical relation and permits the generated steam and remaining water to escape.

The Dix et al. disclosure adds to the conventional fuel assembly, a plurality of less than full length spaced apart so-called "part length (fuel) rods" (PLRs). These fuel rods are supported on the lower tie plate, extend upwardly to and toward the upper tie plate, but terminate short of the upper tie plate. Between the point of part length fuel rod termination and the upper tie plate, the part length fuel rod defines in the upper two phase region of the fuel bundle a vent volume. This vent volume preferentially receives vapor from the liquid vapor two phase mixture in the upper two phase region of the fuel bundle during power producing operation.

Numerous advantages result from the part length rod construction. Improved cold shut down margin enables fuel to be designed with reduced amounts of burnable absorbers such as gadolinium. The tendency of the fuel bundle in the reactor to produce plutonium at the top of the bundle from resonance neutron capture in uranium 238 is reduced. The void overlying the part length rod has an increased vapor fraction with the result that the full length rods adjacent the voids have an increased liquid fraction. Further, the pressure drop in the upper two phase region of the fuel bundle is reduced. This being the case, the fuel bundle enjoys increased stability from thermal hydraulic and nuclear instabilities.

The fuel bundles are elongate. Further, the fuel rods contained within the fuel bundle are flexible. These fuel rods can flex out of their designed side-by-side spacing—and even into interfering contact with one another—due to flow induced vibration and rod bow. Therefore, spacers are utilized throughout the length of the fuel bundle.

Fuel bundle spacers have the function of maintaining the individual fuel rods at given elevations in their designed side-by-side relationship. Such spacers usually define a matrix of individual fuel rod containing cells. These cells fit around each and every fuel rod at their particular elevation in a fuel bundle. The fuel bundle spacers maintain the fuel rods in their designed side-by-side relationship and prevent interfering contact between the individual fuel rods. In the case of the part length rods where the fuel rods do not extend to the upper tie plate, the spacers maintain the fuel rods in their designed upstanding relation.

All fuel bundles—including those having part length rods—must be designed to operate within thermal limits. Specifically, that thermal limit in boiling water reactors known as critical power has always been a limitation. Critical power originates from rupture of the coolant liquid film on the exterior surface of the fuel rod in a phenomena known as "transition boiling."

In this transition boiling condition a liquid film no longer coats the exterior surface of the fuel rod. The rod on the exterior surface is exposed to coolant vapor only. Heat transfer from the fuel interior of the fuel rod undergoing fission reaction to the coolant is reduced. The fuel rod cladding becomes overheated. Naturally, as any fuel rod within a fuel bundle even approaches such a boiling condition anywhere along its length, power is restricted to avoid violation of this "critical power" limitation.

Past experimentation has been directed to the critical power limitation. It is known that by decreasing the spacer pitch in the upper two phase region of the fuel bundle, that critical power can be improved. Unfortunately, the additional spacers caused additional pressure loss. This additional pressure loss causes additional tendencies for instabilities at certain power rates of the reactor. These instabilities include local and core wide thermal hydraulic and nuclear thermal hydraulic instabilities. For these reasons, the experimentally determined improvement of critical power could not be implemented by decreasing the spacer pitch in the upper two phase region of boiling water nuclear reactor fuel bundles.

It is also known to incorporate so-called "swirl vanes" to both boiling water nuclear reactors and the spacers in boiling water nuclear reactors. These devices can be simply summarized and easily understood.

In summary, so-called swirl vanes are placed interstitially of fuel rods. The vanes themselves comprise pieces of metal twisted in a helical pattern. In the earliest known cases, these so-called swirl vanes were the same length as the fuel rods in the reactor. In a later case, a spacer constructed from such swirl vanes was constructed. See Johansson, U.S. Pat. No. 4,913,895 issued Apr. 3, 1990 entitled SWIRL VANES INTEGRAL WITH SPACER GRID.

These swirl vanes when added to reactors had a beneficial effect and a detrimental effect.

The beneficial effect was the classification of water from upwardly flowing water and steam. Specifically, upwardly flowing water and steam. Simply stated, and despite the helical pattern of the twisted metal strips, steam tended to upwardly flow about the swirl vanes. Water, however, did not tend to join this upward flow. Instead the heavier water received a horizontal velocity component from the swirl vanes. As the swirl vanes were placed interstitially of the fuel rods, the heavier water when thrown horizontally by the momentum of the swirl vanes has the beneficial effect of impacting the adjacent fuel rods. Consequently, the critical power limit is increased.

The detrimental effect of such swirl vanes is increased pressure drop. The swirl vanes themselves raise the pressure drop in the upper two phase region of the boiling water reactor. This increase in pressure drop will increase the possibility of instabilities including thermal hydraulic instabilities and nuclear, thermal hydraulic instabilities at high power/low flow conditions of the boiling water nuclear reactor. This being the case, the swirl vanes have not been in large measure introduced into the boiling water nuclear reactors.

Any physical explanation of spacer relative thermal hydraulic performance should depend on the flow regimes that the coolant experiences in flowing up the channel as well as how the flow interacts with the spacer.

Single phase water enters the bottom of the fuel assembly and is heated until sub cooled boiling occurs. Bubbles are formed at the surface of the fuel rod but quickly condense as they contact the bulk sub cooled flow. At the 100% power/100% flow condition bundle average bulk boiling will begin somewhere between the bottom spacer and the second spacer from the bottom of the fuel assembly. Now bubbles in the main flow stream will grow and the flow regime will progress from bubble flow to a type of slug or froth flow where individual small bubbles are starting to combine to make larger slugs of vapor. During these processes the vapor is flowing as bubbles or slugs in a continuous liquid medium.

Depending on conditions somewhere around the middle of the bundle a flow regime transformation takes place. Now there is so much vapor that it becomes the continuous medium and the liquid is either found as a thin film flowing on all the solid surfaces of the bundle or as droplets entrained in the continuous vapor. This is the annular flow regime which is important because it is where dry out or boiling transition will commonly take place in a BWR.

The limiting critical power condition in a BWR has been referred to in the literature alternately as dry out, boiling crisis, critical heat flux, burnout and boiling transition, the term which will be used here. Boiling transition is defined as the first condition of degraded heat transfer in the fuel bundle. This occurs in the annular flow regime as a result of the thin liquid film which covers all the fuel rod surfaces going to zero film thickness. A critical power problem results.

DISCOVERY

We have discovered that there can be a deficiency in fuel bundles having part length rods. Specifically, such fuel bundles have a tendency to have critical power limitations in the upper two phase region of the fuel bundle. This critical power limitation occurs in the full length rods in the upper two phase region of the fuel bundle. It has been determined by experiment that flow rates around and adjacent the full length rods may be below average. This apparently has the tendency to generate transition boiling and the critical power limitations.

The reader will understand that this discovery is not prior art. In so far that discovery can constitute invention, our invention incorporates this discovery.

SUMMARY OF THE INVENTION

In a fuel bundle for use in the core of a boiling water nuclear reactor, part length rods having a tendency to reduce pressure drop are used in combination with spacers and spacer attached devices tending to restore pressure drop to improve critical power. The fuel bundle includes a preferred 9 by 9 matrix of upstanding vertically disposed fuel rods surrounded by a fuel channel between upper and lower tie plates. The tie plates support the fuel rods and permit the entry of water coolant at the lower tie plate and the exit of water and generated steam at the upper tie plate. Part length rods are distributed in the fuel rod matrix and combined with increased spacer pitch. The addition of the part length rods has the advantage of lowering the pressure drop. Spacer additions (such as the increase in spacer pitch in the upper two phase region of the bundle) or spacer attachments (such as vanes and especially so-called swirl vanes) are utilized to restore the pressure drop removed by the insertion of the part length rods. There results a serendipitous improved critical power performance in the upper two phase region of the fuel assembly.

One method of achieving the disclosed result is the increase in total number of spacers in the upper two phase region of the fuel bundle to increase pressure drop. The spacers are distributed in the lower portion of the fuel bundle on about 20 inch centers. The increased number of spacers in the upper two phase region of the fuel bundle includes placing them on a pitch of less than 20" so as to allow for the addition of at least one spacer in the upper two phase region of the fuel bundle. The additional spacer is not required for the traditional purpose of preventing either rod bow or flow induced vibration. Indeed the additional spacer causes the pressure loss in the upper two phase region of the fuel bundle to be in part restored to that pressure loss that would be present if the fuel bundle contained an array having full length fuel rods only. However, the additional spacer causes the critical power of the fuel bundle to be improved. There results a fuel bundle with part length rods having all of the advantages inherent in the part length rod construction plus the added benefit of increased critical power.

Alternately, and in addition to the disclosed decrease in spacer pitch, spacers incorporating vanes can be used. By way of example, these vanes can be our preferred partial or complete swirl vane arrays. The vanes are incorporated to the spacers in the interstitial volumes between the fuel rods. Such spacers, although increasing pressure drop, cause improvement in critical power. In the case of the incorporation of vanes to the spacer, increased pitch of spacers is not required.

Other expedients of spacer modification for realization of pressure drop are disclosed. Spacers on the same pitch having increased vertical height can be utilized. Further, spacer fabricated from thicker metallic construction can be used. In short, an device—preferably a spacer—in the upper two phase region of the fuel bundle which adds back the pressure drop lost by the use of part length rods is sufficient for the practice of this invention.

Separation devices can also be used. Two classes of separation devices are disclosed. A first type of device fits to the end of part length rods and is primarily intended for preventing water passing along the surface of the part length rod adjacent the end of the part length rod from entering the volume overlying the part length fuel rod. A second type of device resides in the volume overlying part length rods. This device serves the purpose of ejecting water entrained into the steam vent volume overlying part length rods. These devices can be extended and interconnected. In either case, improved concentration of steam to the vent volume overlying the part length rods with high liquid fraction residing in the surrounding full length rods results.

OTHER OBJECTS, FEATURES AND ADVANTAGES

A fundamental difficulty in BWR fuel design results from the large variations in moderator density caused by vapor formation. Current design approaches provide some compensation for this by introducing captive-liquid within the fuel bundle. Examples are the various water-rod and water-cross designs. While these approaches provide for effective neutron moderation, their associated blockage of normal coolant flow area causes entirely adverse thermal hydraulic effects. This is particularly true as the blockages become large. In contrast, the steam-vent approach provides synergistic benefits for both neutron moderation and thermal hydraulics.

Diverting significant vapor into a low-resistance flow path will allow the average vapor velocity to increase, and thereby reduce the average void fraction. More importantly, local void fractions around the fuel rods will be reduced even more due to the removal of vapor from that region. In contrast, the flow blockages caused by captive-liquid regions force all of the normal liquid and vapor to flow together around the fuel rods, at even higher velocities. This increases local void fractions around the fuel rods. Thus the neutron moderation benefits with steam-vent designs can easily exceed those achieved using large captive liquid regions.

The low resistance flow path for vapor will reduce pressure drop in the two-phase region. Removal of normal spacer structure within the steam-vent path will reduce the pressure drop from each spacer, allowing for more spacers to be added (with associated critical power and rod-bow benefits). Channel stability will be improved both by the reduced two-phase pressure drop, and by the damping effect from a separate high velocity flow path within the fuel bundle.

An object of this invention is to disclose a first class of separation devices for inhibiting the entry of water into the steam vent volumes overlying the part length rods. According to this aspect of the invention, the part length rod is provided with an attachment at its upper terminal end. This attachment can be either a flared end, deflecting tabs, or a spirally wound piece of metal, hereinafter referred to as a swirl vane. Steam and water passing along the length of the outside of the part length rod adjacent the rod end impact the attachment. Water—with its higher mass—is deflected. Steam—with its lower mass—continues substantially undeflected upwardly into the vent volume overlying the part length rod. There results a reduction of water introduction into the steam vent volume overlying the part length rod.

An additional object of this invention is to place steam separation devices in the region overlying one or more part length rods. These devices can be placed at discrete locations, some distance from the part length rods, or they can extend continuously through the void volume overlying the part length rods. Preferable attachment and suspension of such devices is from spacers overlying the ends of the part length rods, or from the upper tieplate. The suspended devices can include twisted metal strips, hereinafter referred to as swirl vanes, cones, or other steam separation devices. Remaining water introduced into and entrained into the steam vent volume is ejected.

An advantage of both the attachment to the end of part length rods and the separation device overlying the end of part length rods is flexibility in placement of part length rods while maintaining more effective steam vent channels side-by-side with surrounding higher liquid fraction about the full length rods. There results improved nuclear reaction, improved heat transfer, improved stability and lower pressure drop.

An object of this invention is to disclose a balance between the loss of pressure drop due to judicious use of part length rods and the increase in critical power due spacer attached devices restoring the originally decreased pressure drop. There results an improved critical power.

A further object of this invention is to set forth preferable spacer attached devices for the increase of critical power through increased pressure drop. By way of example, either increased spacer pitch or the addition of vanes, such as swirl vanes can be used. In either case, the decrease in critical power due to the presence of the part length rods is considerably less than the increase in critical power due to spacers causing the recaptured pressure drop. As a result, overall critical power is improved.

By way of example, and using the combination of actual tests and the spacer pitch of FIGS. 2A and 2B with a 9 by 9 array of fuel rods with eight part length rods distributed in a fuel bundle, pressure drop improves 8% or 1.2 psi. in the upper two phase region of the fuel bundle. Critical power loss due to the presence of the part length rods may be in the range of 2 to 4%. At the same time, and as a result of the decreased spacer pitch, pressure drop increases 0.8 psi. in the upper two phase region of the bundle. At the same time critical power gains over the part length rod array have been measured experimentally to be as much as 12%. Thus the net overall gain in critical power could be as much as 10% with pressure drop remaining substantially unchanged relative to the same fuel rod bundle having full length rods.

Regarding decreased spacer pitch, the total number of spacers in the upper two phase region of the fuel bundle is increased. Alternately, the spacers may be increased in vertical height. Further, and as a substitute, the thickness in material from which the spacers are fabricated can be increased. In either event, upon the recapture of the originally obtained pressure drop, improved critical power results.

Regarding the vane embodiment of this invention, the reader will understand that vanes incorporated to spacers have two effects. First, they are higher pressure loss devices causing pressure drop and hence improved critical power "downstream" (up above) their particular location in a fuel bundle. Thus, where spacers with vanes are utilized, decreased spacer pitch may not be required.

The reader should understand that we do not necessarily identify the specific mechanism causing the beneficial increase in critical power. We do identify that where pressure drop is increased, critical power is likewise increased in the upper two phase region of the fuel bundle.

The reader will understand that fuel rods are designed to have reduced power output above the last spacer. This being the case, it will be understood that the top most or last spacer is not required to have an appreciable pressure drop effect on the passing fluid flow. Thus in this last location, the use of an Inconel spacer having minimal critical power effect on the passing fluid flow with corresponding reduced pressure drop can be used.

BRIEF DESCRIPTION OF THE DRAWINGS

FIG. 1 is a perspective broken away view of a fuel bundle according to this invention illustrating the fuel bundle having a matrix of part length rods and showing in the upper two phase region of the fuel bundle the decreased spacer pitch;

FIG. 8 is a side elevation section of a spacer having increased vertical height;

DESCRIPTION OF THE PREFERRED EMBODIMENT

Figure 2A:
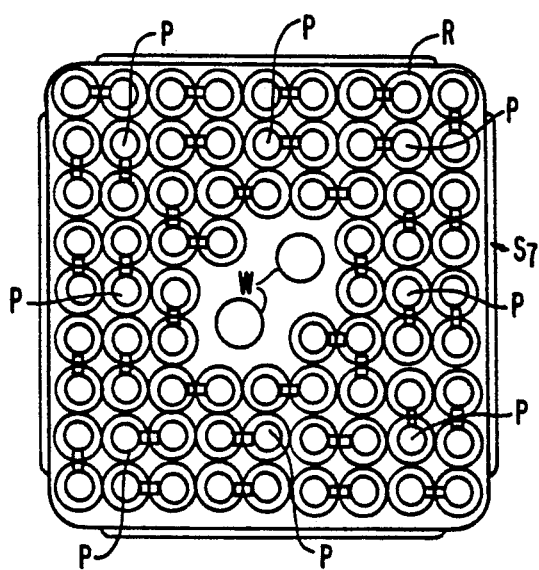
FIG. 2A and 2B are respective plan sections of the fuel bundle of FIG. 1 illustrating partial length rods in the preferred 9 by 9 matrix, it being realized that the particular matrix utilized can be considerably varied.
Figure 2C:
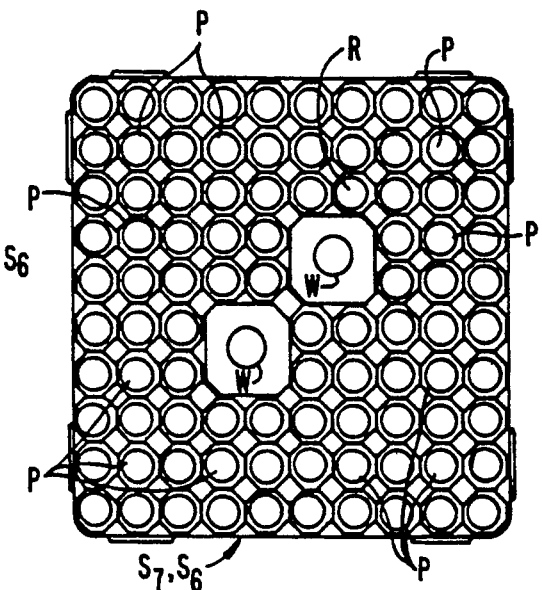
FIG. 2C and 2D are respective plan sections of the similar to but not identical with the fuel bundle of FIG. 1 illustrating partial length rods in the preferred 10 by 10 matrix, it being realized that the particular matrix utilized can be considerably varied.
Figure 2B:
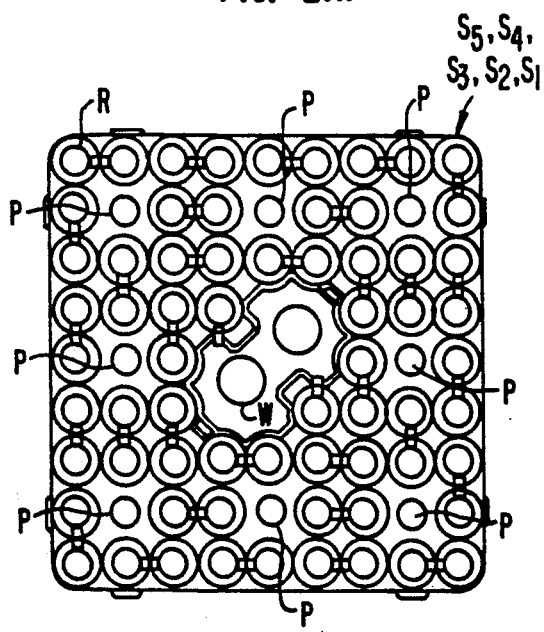

Referring to FIG. 1, 2A and 2B, the prior art construction of a fuel bundle can be understood insofar as it is relevant here.

A fuel bundle B is illustrated, having a channel C with an upper tie plate U and a lower tie plate L. A plurality of fuel rods R are supported on the lower tie plate L, and extend upwardly to and toward the upper tie plate U. In the embodiment here shown, a large central water rod W is utilized.

Operation of the fuel bundle as part of a core in a large boiling water reactor (not shown) can be understood. Water enters through lower tie plate L. The water passes through upwardly and about the rods R. During this passage, steam is generated. Finally, a steam and water mixture passes outwardly up and through the upper tie plate U. During the steam generation, channel C isolates the core bypass volume from the flow interior of the fuel bundle.

Figures 3A, 3B, 3C, 3D, 3E, 3F:
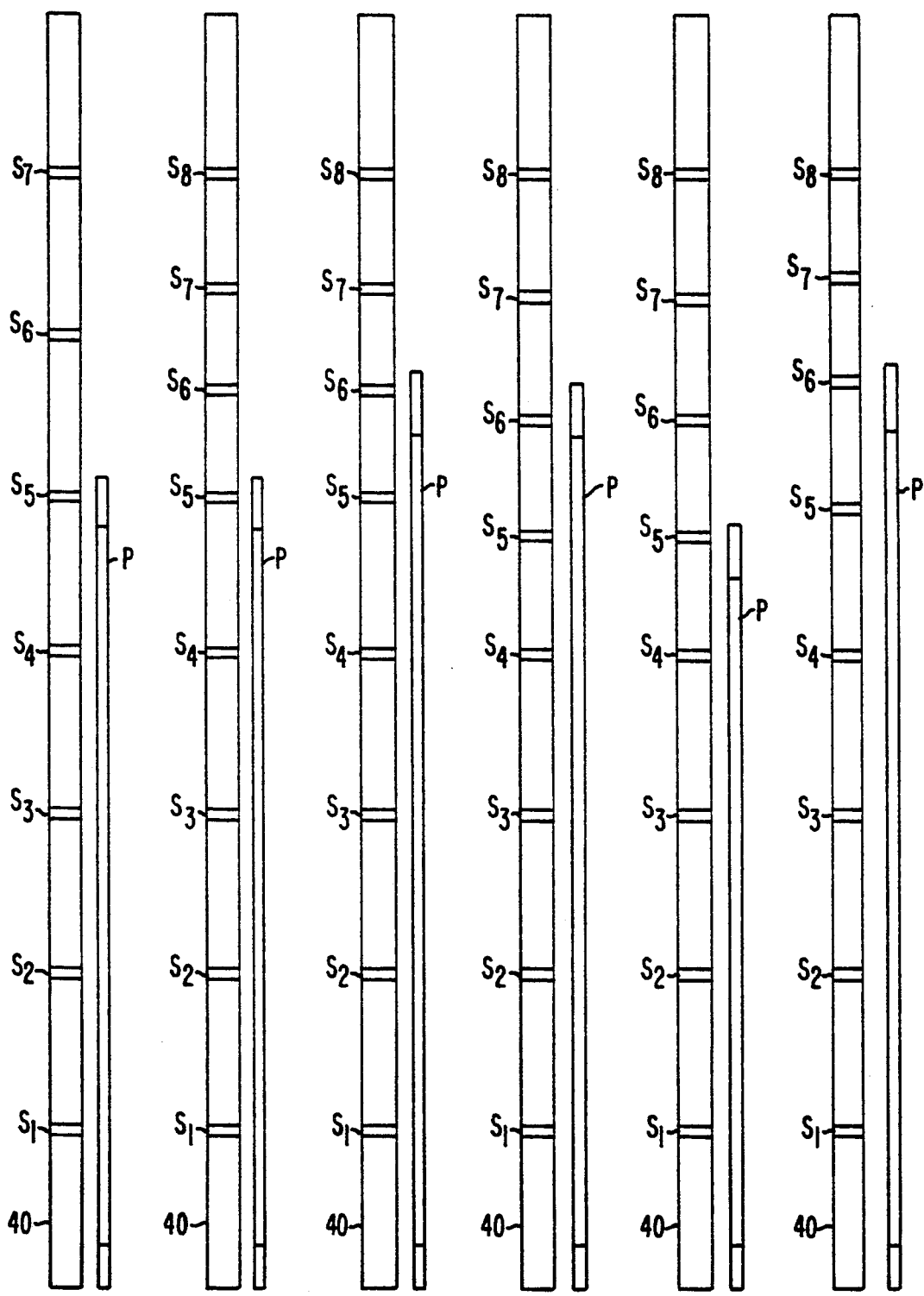
FIGS. 3A-3F are schematic graphics illustrating the spacers alone as planar elements illustrating the relative placement of the eight spacers of this invention along the axial length of the fuel bundle relative to the upper and lower tie plates.

As shown in FIG. 1, and 3A, seven spacers $S_1$-$S_7$ are normally utilized. These spacers are shown respectively in FIGS. 2A and 2B.

With respect to FIG. 2A, spacers $S_5$ through $S_1$ occupying positions in the lower portion of the fuel bundle B are illustrated for a 9 by 9 fuel rod matrix. These spacers surround the large water rod W and maintain individual rods at their discrete elevations in the proper alignment.

Referring to FIG. 2B, the upper spacers $S_6$ and $S_7$ are illustrated. These respective spacers raise the rod matrix above the termination of the so-called "part length rod."

As of this writing, the preferred embodiment of this invention includes the 9 by 9 array of FIGS. 1, 2A and 2B.

With respect to FIG. 2C, spacers $S_5$ through $S_1$ occupying positions in the lower portion of a fuel bundle similar to fuel bundle B are illustrated for a 10 by 10 fuel rod matrix. These spacers surround the large water rod W and maintain individual rods at their discrete elevations in the proper alignment.

Figure 2D:
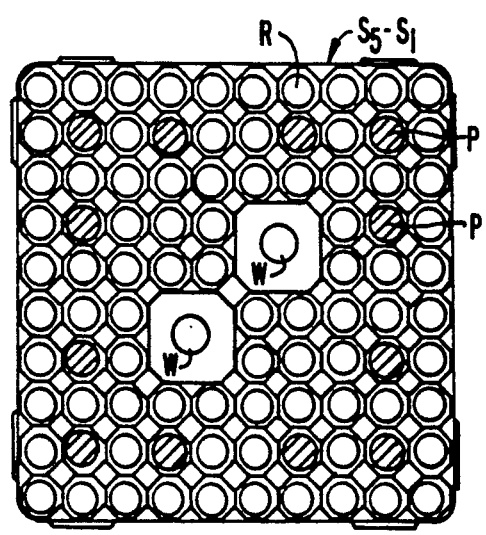

Referring to FIG. 2D, the upper spacers $S_6$ and $S_7$ are illustrated. These respective spacers raise the rod matrix above the termination of the so-called "part length rod." Referring to Dix et al., U.S. Pat. No. 5,112,570, issued May 12, 1992 entitled TWO-PHASE PRESSURE DROP REDUCTION BWR ASSEMBLY U.S. patent application Ser. No. 07/176,975 filed Apr. 4, 1988) In that application, it was disclosed to place within the fuel bundle a group of part length rods P.

Simply stated, and above spacer $S_5$ and before spacers $S_6$ and $S_7$, part length rods P were utilized. The part length rods were supported on the lower tie plate L. They extended up to and through spacer 5. They terminated a short distance above spacer 5.

From their point of termination above spacer 5, the part length rods P define voids in the upper two-phase region of the fuel bundle.

Benefits are realized from this construction. These have been set forth above.

As the reader undoubtedly further understands, we have, through extensive testing, discovered that critical power is less than anticipated in the upper two-phase region of the illustrated fuel bundle compared with all full length rods in the bundle. That is to say, above the part length rods and through the end of the active fuel of the full length fuel rods R, critical power conditions may be met prematurely at the fuel rods. This being the case, the entire bundle must be limited so that at no individual point on any individual fuel rod R, the critical power limitations are exceeded.

Referring to FIGS. 3A through 3F, the invention herein is schematically illustrated.

FIG. 3A, only, represents prior art. Specifically, only two elements are illustrated.

First, there is a bar graph 40. Bar graph 40 shows seven spacers $S_1$-$S_7$, all on 20 inch centers.

Secondly, there is a partial length rod P illustrated. Partial length rod P is shown being approximately 102" in length, and terminating just above spacer $S_5$. This bar graph illustrates the construction set forth in FIG. 1.

FIG. 3B is our preferred embodiment. Specifically, it constitutes a configuration on which actual tests have been run. Partial length rod P is 102" in length. Spacer distribution from spacer $S_1$ through spacer $S_5$ is the same as it has been before. Spacers $S_6$, $S_7$ and $S_8$ are on respective 13.3" centers. As the reader will understand, an additional spacer $S_8$ has been added.

In all of the embodiments that follow, the reader will understand that the additional spacers are more than that number required to maintain the rods against rod bow and in their design side by side relation. Further, the spacers are ferrule-type spacers, utilizing a relatively thin zircaloy metal (in the thicknesses generally about 20/1000ths of an inch). It has been found that improved critical power results.

Once the configuration of FIG. 3B is understood, other possible configurations suggest themselves. They will be briefly addressed below.

With respect to FIG. 3C, bar graph 40 shows a part length rod approximately 115" long, extending up to, through and including spacer $S_6$. The spacer separation is the same as FIG. 3B.

Referring to FIG. 3D, a part length rod 113" is utilized. The spacing of the spacers differs only above spacer $S_4$. From spacer $S_4$ through spacer $S_8$, the spacers are on 15" centers.

Regarding FIG. 3E, it will be understood that the spacing of the spacers remains the same as in FIG. 3D. However, the part length rod is 97" long, and thus is braced at spacer $S_5$.

Regarding FIG. 3F, the design there appears to have potential even exceeding our preferred embodiment which we illustrate in FIG. 3B. As of the writing of this patent application, this configuration has not been specifically tested. We therefore do not claim it as our preferred embodiment, but do call to the attention of the reader the fact that this design may be beneficial.

Simply stated, and above spacer $S_4$, the pitch of the spacers $S_5$, $S_6$, $S_7$ and $S_8$ gradually decreases. The partial length rod used with the design is 116" in length, and extends through spacer $S_6$. Specifically, between spacer $S_4$ and $S_5$ an 18" separation is utilized. Between spacer $S_5$ and $S_6$, a 16" separation is utilized. Between spacers $S_6$ and $S_7$, a 14" spacing is utilized. Finally, between spacers $S_6$ and $S_8$, a 12" spacing is utilized.

The reader will realize that in this latter design, decreasing spacer pitch occurs at that portion of the fuel bundle wherein the void fraction increases.

It has been found in addition to the increased spacer pitch, that spacers incorporating swirl vane constructions in the upper two phase region of the fuel bundle in conjunction with partial length rods have the same overall beneficial effect. Specifically, critical power is increased even though the insertion of the spacers having the swirl vanes tends to restore some—if not all—of the improved pressure drop in the upper two phase region of the fuel bundle. Accordingly, the following constructions are exemplary of spacers which when left on a regular pitch through the incorporation of swirl vanes produce an increased critical power phenomenon.

Figure 4C:
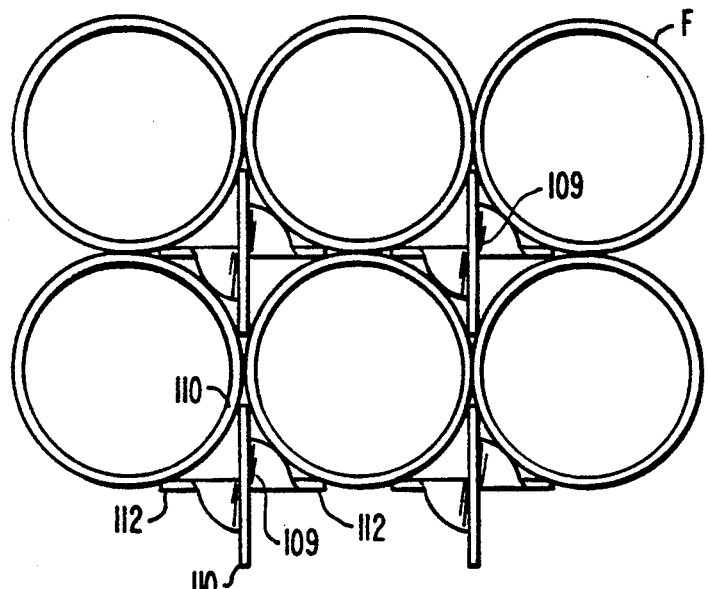
FIGS. 4A-4C are respective side elevation before twisting, side elevation after twisting, and plan view after installation of swirl vanes incorporated to a Zircaloy spacer of the ferrule type.
Figure 4B:
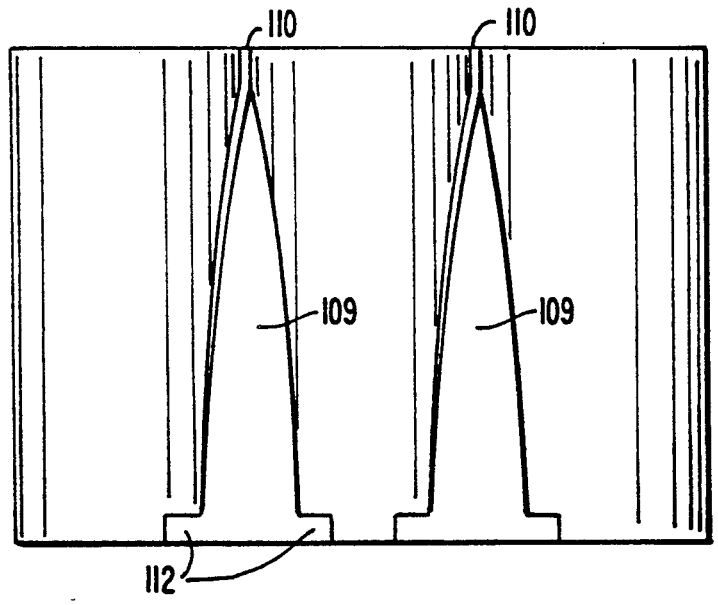
Figure 4A:
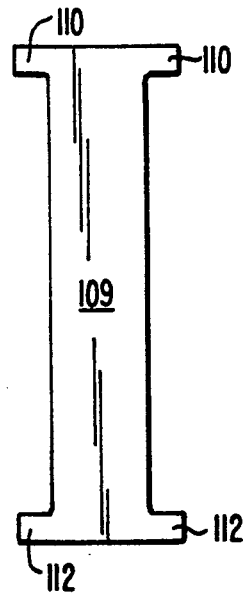

Referring to FIG. 4A, an I shaped tab 109 having tabs 110 at the upper portion and tabs 112 is shown in the planar mode before twisting. FIG. 4B shows this construction in the twisted configuration. FIG. 4C shows the swirl vane incorporated to ferrules at their respective upper and lower ends. In this configuration, the main portion of the tab 109 deflects water towards the rods of the spacer while vapor is allowed to continue upwardly. More importantly, this spacer when incorporated to spacers S7, S6 and S5 of FIG. 3A or spacers S8, S7, S6 or S5 of FIGS. 3B–3F enables fuel bundles having part length rods to realize improved critical power.

It is important to note a distinction. FIG. 3A insofar as it discloses ordinary spacers in combination with part length rods is prior art. However, when spacer having swirl vanes are added in addition to a fuel bundle having part length rods, the improved critical power limitations of this invention are realized.

Figure 5C:
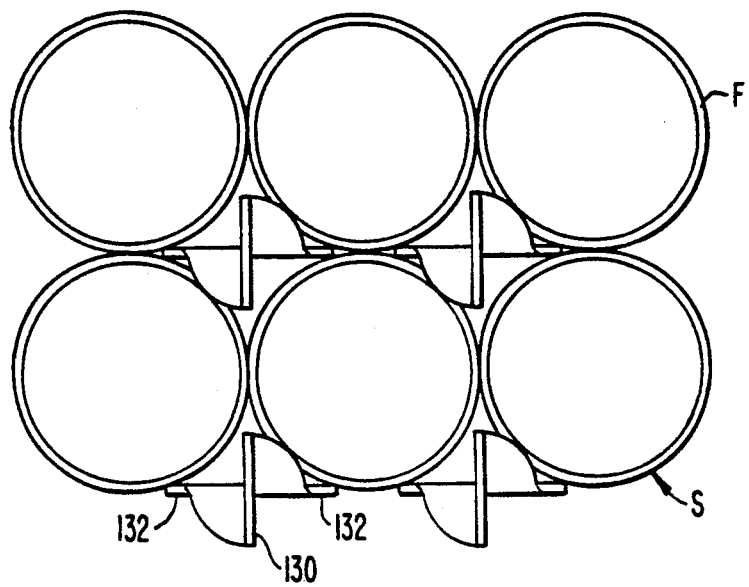
FIGS. 5A-5C are respective side elevation before twisting, side elevation after twisting, and plan view after installation of swirl vane tips incorporated to a Zircaloy spacer of the ferrule type.
Figure 5A:
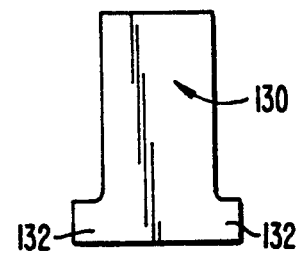
Figure 5B:
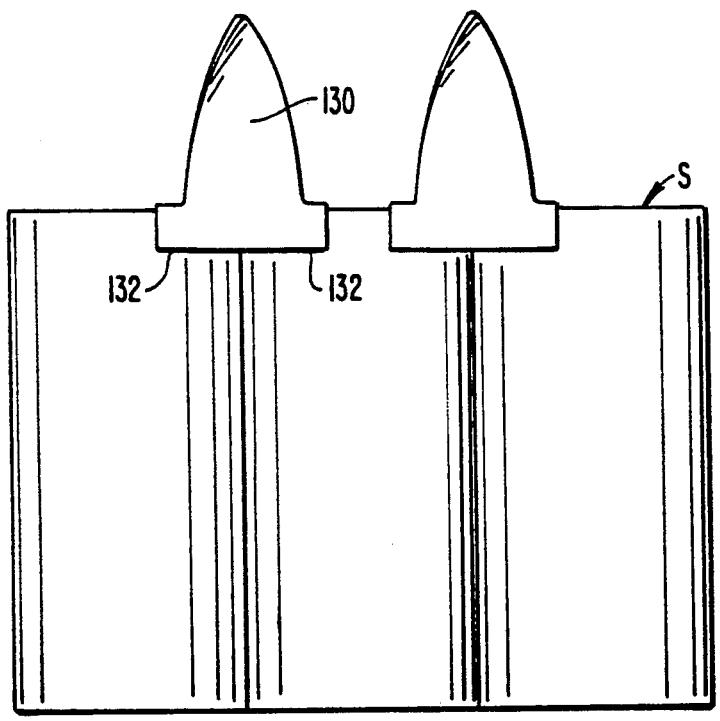

It is not necessary that the swirl vanes extend the entire length of the spacer. Specifically FIG. 5A illustrates a swirl vane end tab 132 before twisting. This swirl vane end tab 132 is show twisted and attached to the ferrule spacer construction illustrated in side elevation and plan respectively in FIGS. 5B and 5C. Attachment occurs at tabs 132 to the sides of the ferrules F so that turbulence imparting protrusion occurs above the spacer S.

Figure 6C:
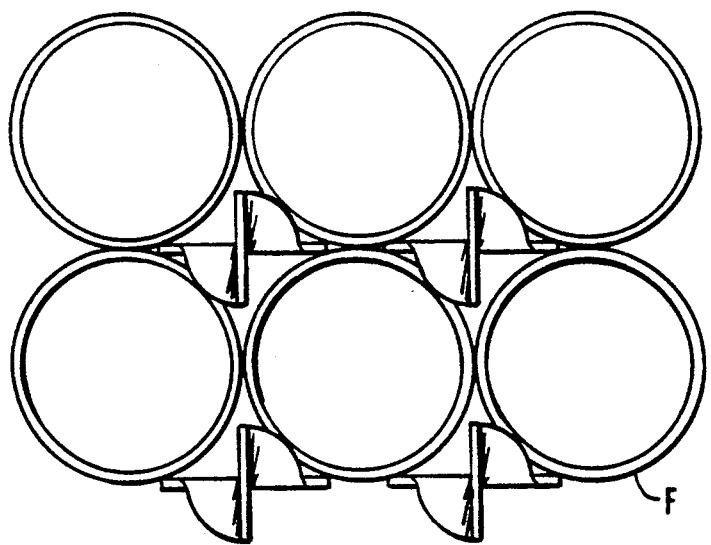
FIGS. 6A-6C are respective side elevation before twisting, side elevation after twisting, and plan view after installation of swirl vane tips incorporated to a Zircaloy spacer of the ferrule type, the tips here having fastening tabs extending parallel to the sides of the ferrules of the spacer.
Figure 6B:
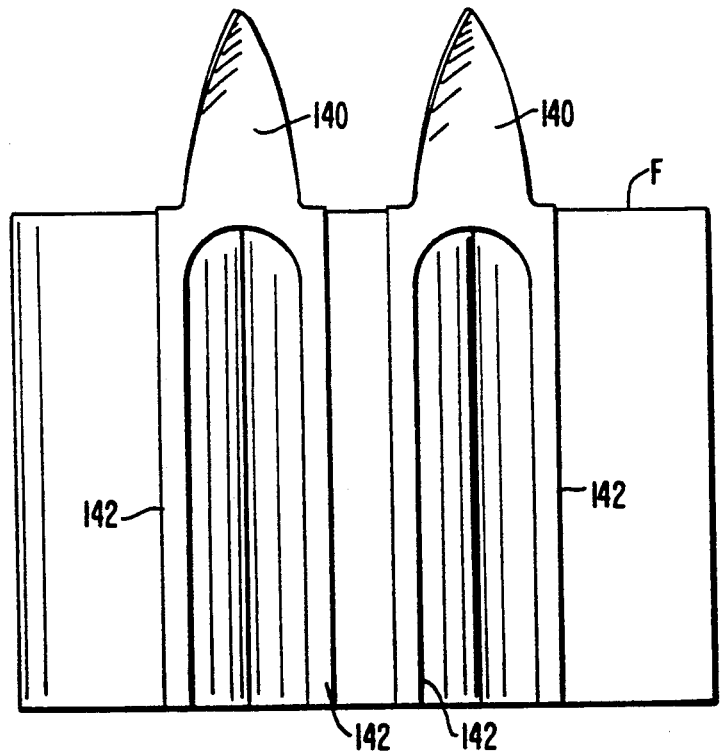
Figure 6A:
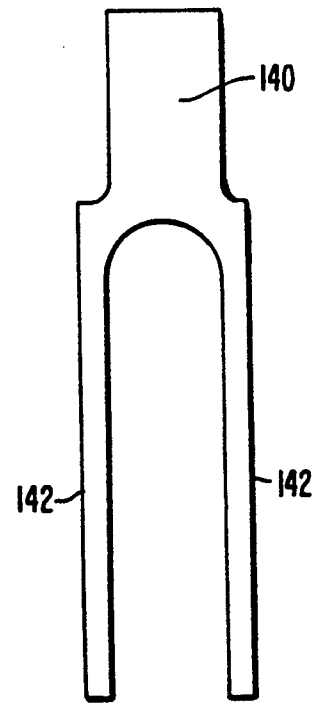

Other constructions can be utilized. Referring to FIG. 6A, a tab 140 having depending arms 142 is shown before twisting. In respective FIGS. 6B and 6C, attachment of the tabs occurs to the ferrules F with the full length of the arms 142 effecting secure fastening of the arms to the ferrules F.

Figure 7B:
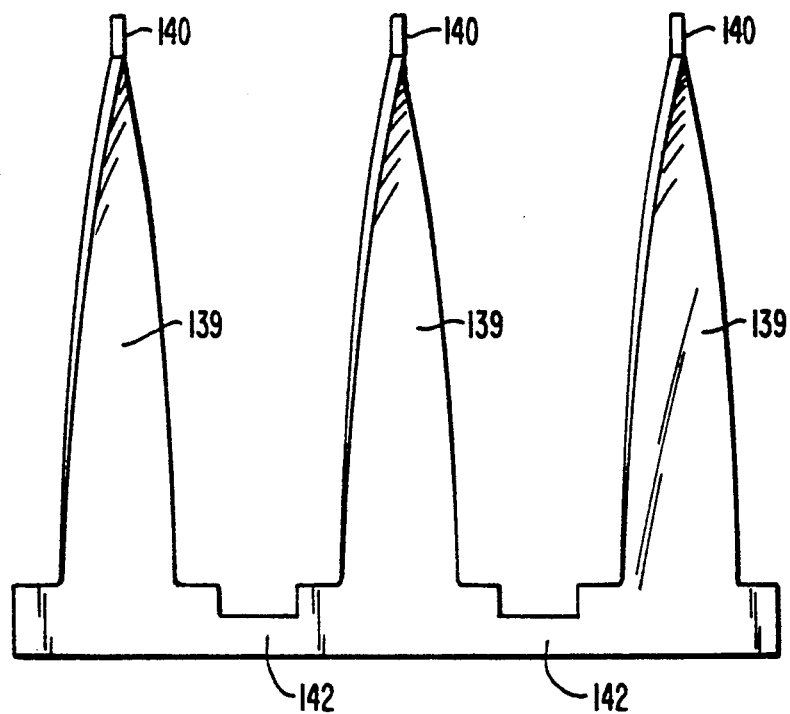
FIGS. 7A and 7B are side elevations of swirl vanes before and after being twisted to impart the helical configuration of this invention.
Figure 7A:
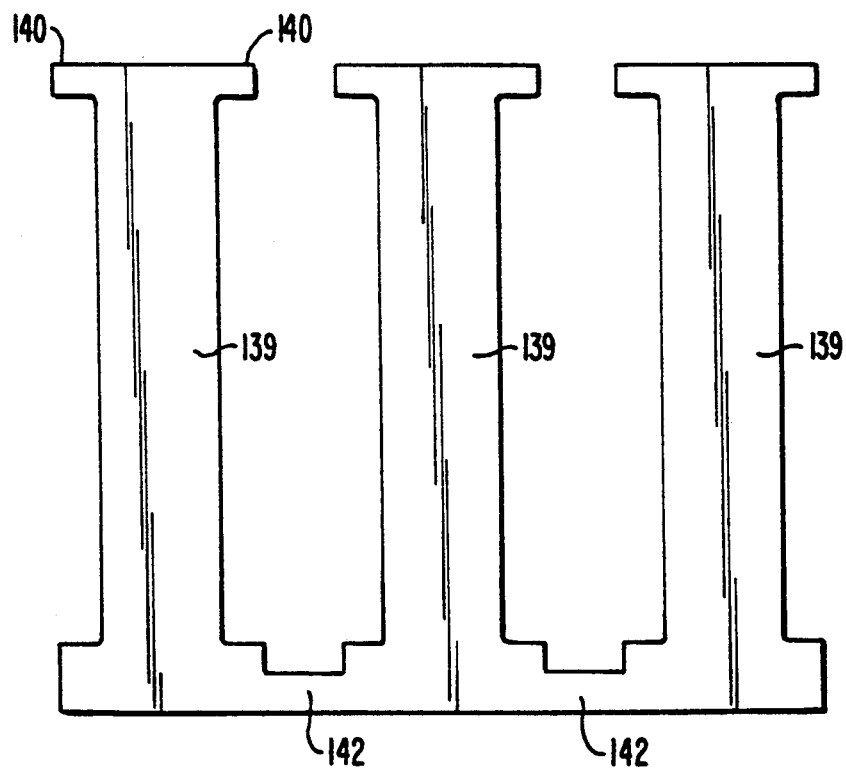

Finally, referring to FIG. 7A, a swirl vane 139 is shown in the untwisted state. Referring to FIG. 7B, the respective swirl vanes 139 have all been twisted. Tabs 140 are then ready for attachment to a ferrule spacer.

Figure 7D:
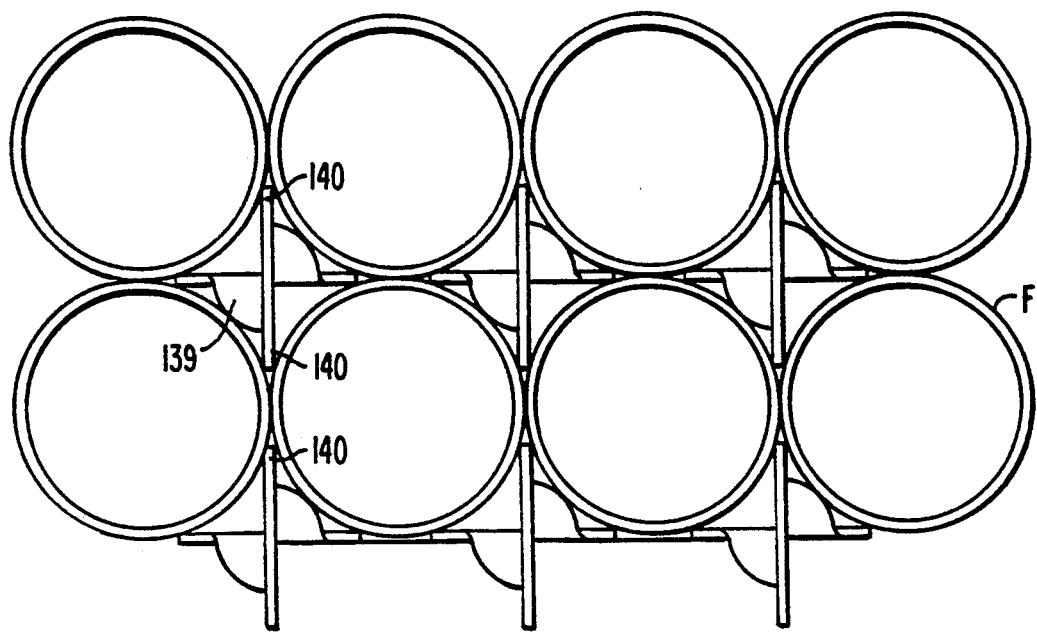
FIGS. 7C and 7D are respective side elevation and plan views of the swirl vanes incorporated to ferrule spacers.
Figure 7C:
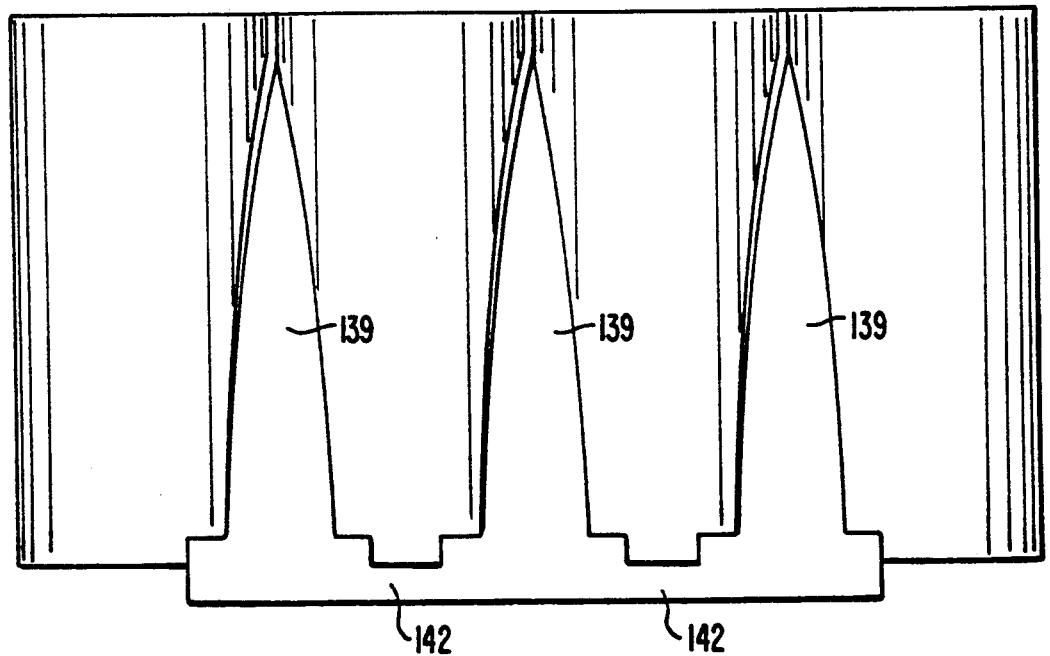

Referring to FIGS. 7C and 7D attachment to the respective ferrules can be seen. Referring to FIG. 7C, an important detail can be noted. It is important that continuous web 142 not interfere with the spacing or pitch at the bottom of the spacer. Such interference could seriously alter the side-by-side spacing of the ferrules F. Accordingly, the tabs 139 have a length so as to dispose the continuous web 142 below the side-by-side ferrules F.

As has been set forth above, other expedients associated with the spacers can be utilized to realize increased pressure drop. For example, in FIG. 8, a spacer of increased vertical height is utilized. Additionally, spacers having metallic constructions from thicker metallic sheets may be utilized. All that is required is to recapture at least some of the pressure drop achieved by the insertion of the part length rods.

Regarding the extent of this recapture of pressure drop, we prefer to recapture less than all of the pressure drop realized. Accordingly, this leaves the upper two phase region of the fuel bundle with less pressure drop than the same bundle would have had with only full length rods.

It is important to note that we use the increased spacer pitch or the swirl vanes attached to the spacer in combination with the two phase flow at the top of the fuel bundle. We rely on the effect of the spacer co-acting with the flow after it has passed through the spacer. This "downstream flow" occurs upwardly from the spacers after the two phase flow has passed over one of the spacers. This effect is important with respect to spacers S7 (FIGS. 3B–3F), spacer $S_6$ and spacer S5.

The top most spacer, spacer S7 in FIG. 3A and spacer S8 in FIGS. 3B–3F is an exception to this flow principle.

It is not required that the top most spacer S7 in FIG. 3A or spacer S8 in FIG. 3B–3F be either a ferrule type spacer or have swirl vanes attached. In most fuel loadings, the kilowatt output per foot above the top most spacer is not at a level where transition boiling leading to adverse critical power ratios can occur. Consequently, an inconel spacer having low pressure drop with higher neutron absorption can be successfully used at this location. This upper spacer need not incorporate the increased spacer pitch or the disclosed swirl vanes.

It will be apparent that this invention will admit of modification.

It further will be appreciated that the decreased spacer pitch above the termination point of the partial length rods, is a major characteristic of this invention.

Figure 9:
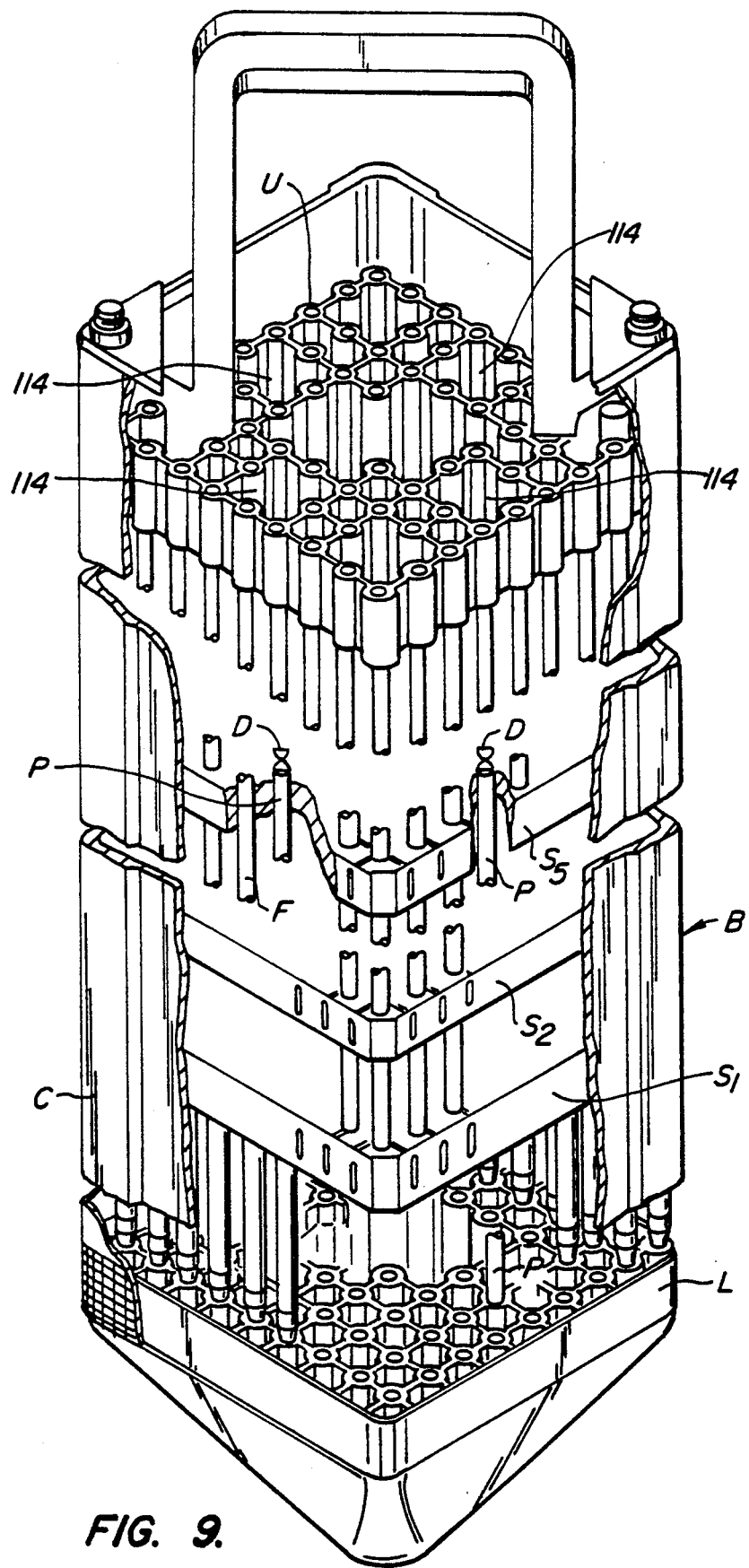
FIG. 9 is a perspective of a fuel bundle having a portion of the channel broken away to expose the contained part length fuel rods with the separation devices of this invention overlying the ends of the part length fuel rods.

Referring to FIG. 9, a fuel bundle B is illustrated. Bundle B includes a lower tie plate L, an upper tie plate U and a 9-by-9 matrix of discrete fuel rods F. A channel C surrounds the respective fuel rods and extends from the lower tie plate L to the upper tie plate U. Lower tie plate L supports the fuel rods F in a side-by-side matrix; upper tie plate U assures that the fuel rods are maintained in vertically upstanding relation.

The fuel rods extend over a distance of approximately 160 inches and are flexible. This being the case, a group of spacers (typically in the order of 7) maintain the side-by-side relationship of the fuel rods F. In FIG. 9 spacers $S_1$, $S_2B$ and $S_5$ illustrate three of the normally seven evenly placed spacers extending along the length of the fuel bundle B.

Operation of the fuel bundle can be summarized. Typically, water moderator enters through lower tie plate L at defined apertures between the matrix of fuel rods F. The water flow is confined by channel C to flow outwardly through upper tie plate U. As the water moderator passes upwardly through the fuel bundle, steam is generated in increasingly higher fractions. Finally, at the top of the fuel bundle and up and through upper tie plate U, the discharge of water and steam occurs.

Fuel bundle B contains part-length rods P. Such part-length rods P are disclosed and claimed in Dix, et al. U.S. Pat. No. 5,112,570 entitled TWO PHASE PRESSURE DROP REDUCTION BWR ASSEMBLY DESIGN issued May 12, 1992, (formerly U.S. patent application Ser. No. 07/176,975 filed Apr. 4, 1988). It will be noted that the two partial length rods P illustrated are spaced apart. Additionally, and overlying the part-length rods, there is defined an open spatial interval in the fuel bundle which interval is designated 114. As set forth in this original disclosure, these disbursed flow channels realize the natural tendency of the vapor phase of the two-phase mixture to migrate or drift towards the low resistance flow paths formed at the void volumes 114. It has been found that such disbursed flow paths are favorable to provide an improved fuel to moderator ratio in the upper two phase region of the bundle as well as to provide a low pressure drop path for the venting of steam which imparts combined nuclear, stability and thermal hydraulic advantages.

At the end of each partial length rod P, I illustrate a separation device D. Generally stated, the purpose of the separation devices D as set forth in this specification is to separate water from the volumes 114 which may either be entered into or be entrained into the upwardly venting steam within volumes 114. This enhances the natural tendency for steam to flow in these volumes such that even better steam venting benefits can be achieved without the part length rods being spaced apart.

Figure 18:
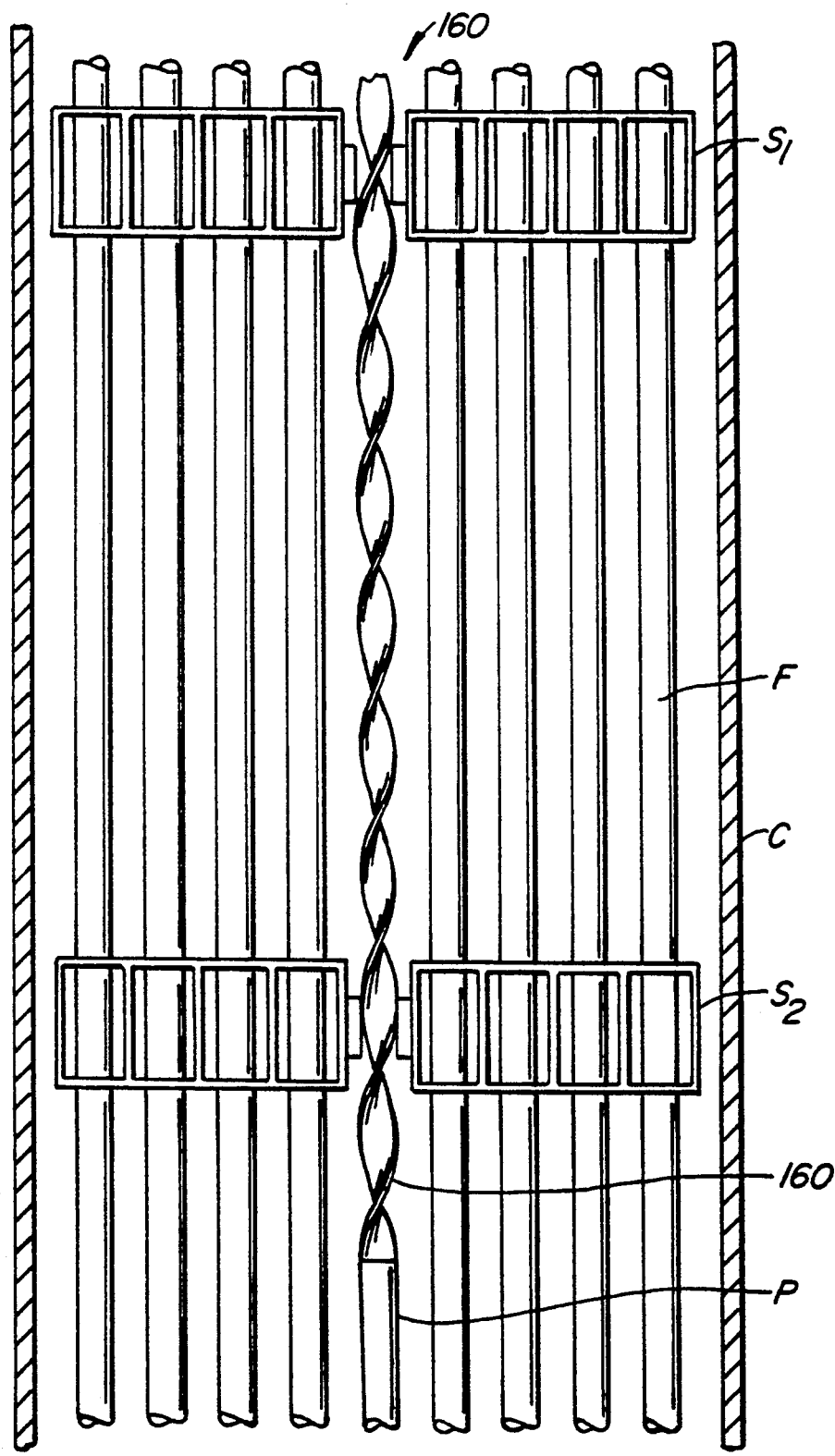
FIG. 18 illustrates a part length fuel rod with an attached overlying swirl vane that extends axially between spacers.
Figure 19:
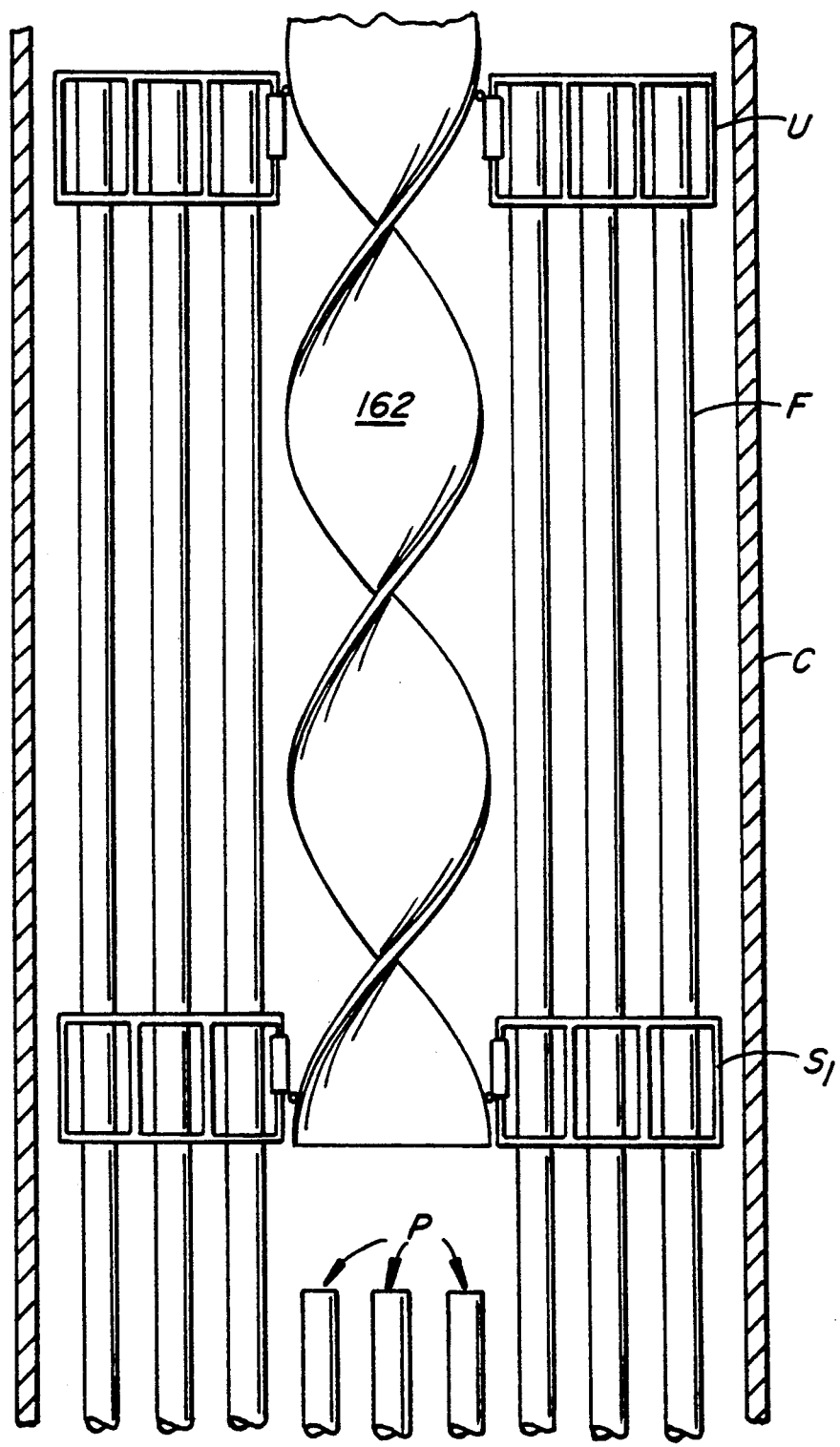
FIG. 19 illustrates an array of adjacent part length fuel rods with an overlying swirl vane of comparable diameter, that extends axially between spacers.
Figure 20:
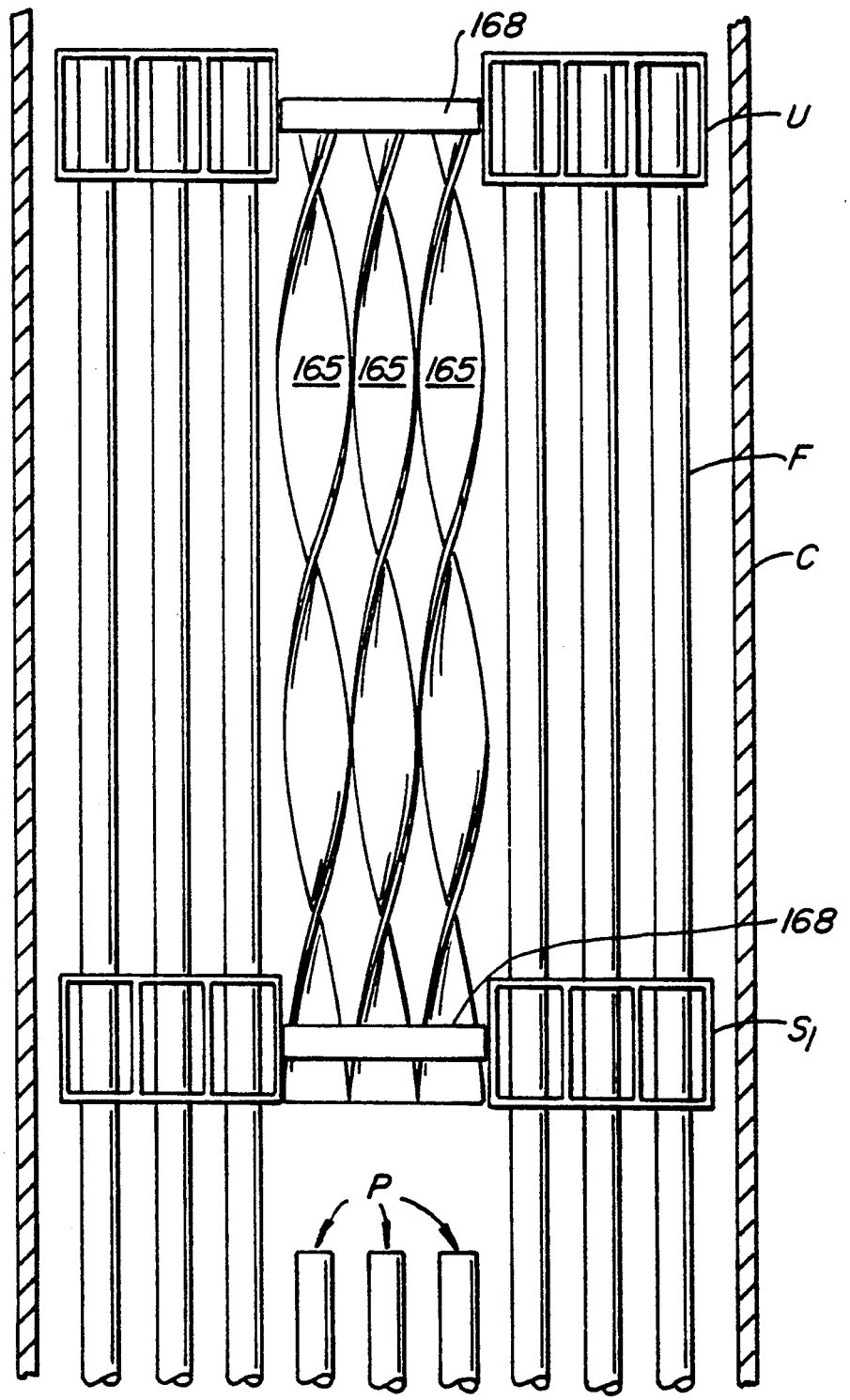
FIG. 20 illustrates an array of adjacent part length fuel rods with an overlying matrix of swirl vanes that extend axially between spacers, the number of swirl vanes in the matrix being equal to or less than the number of part length rods below.
Figure 22:
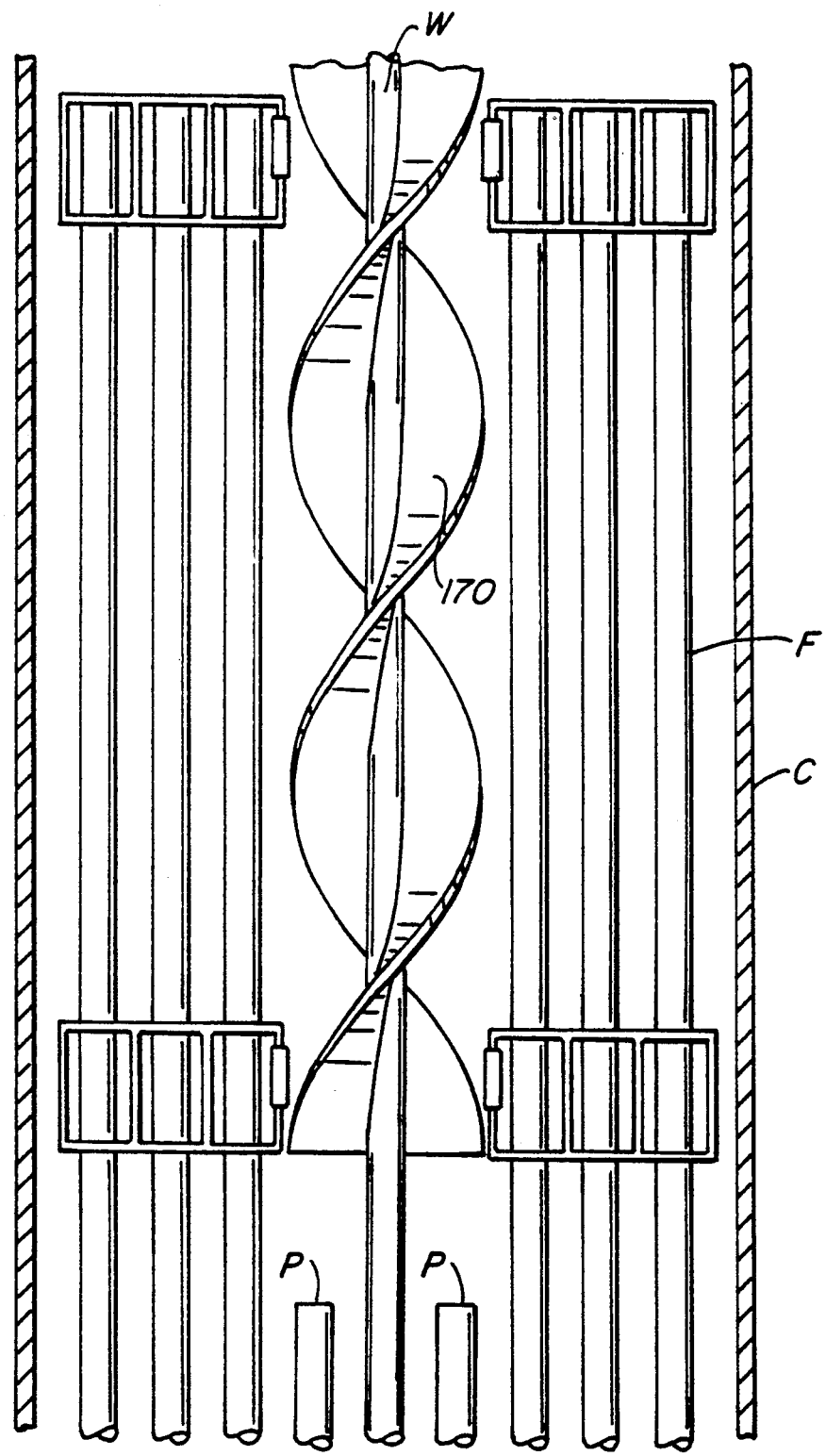
FIG. 22 illustrates a construction similar to FIG. 19, except that the overlying swirl vane is formed integral with a water rod that extends upward from the inlet region of the fuel assembly.
Figure 23:
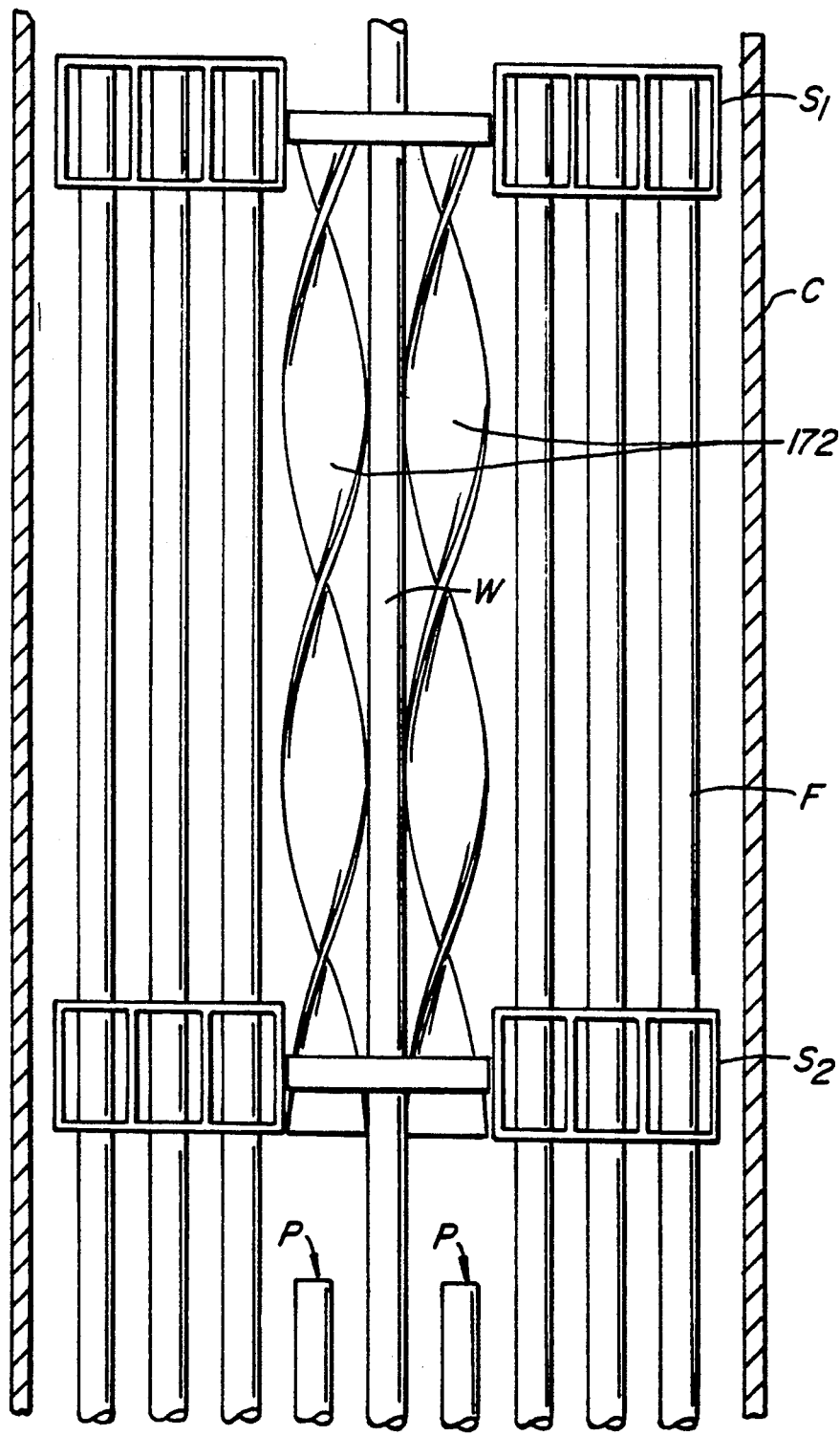
FIG. 23 illustrates a construction similar to FIG. 19, except that the overlying matrix of swirl vanes is formed integral with a water rod that extends upward from the inlet region of the fuel assembly.
Figure 24:
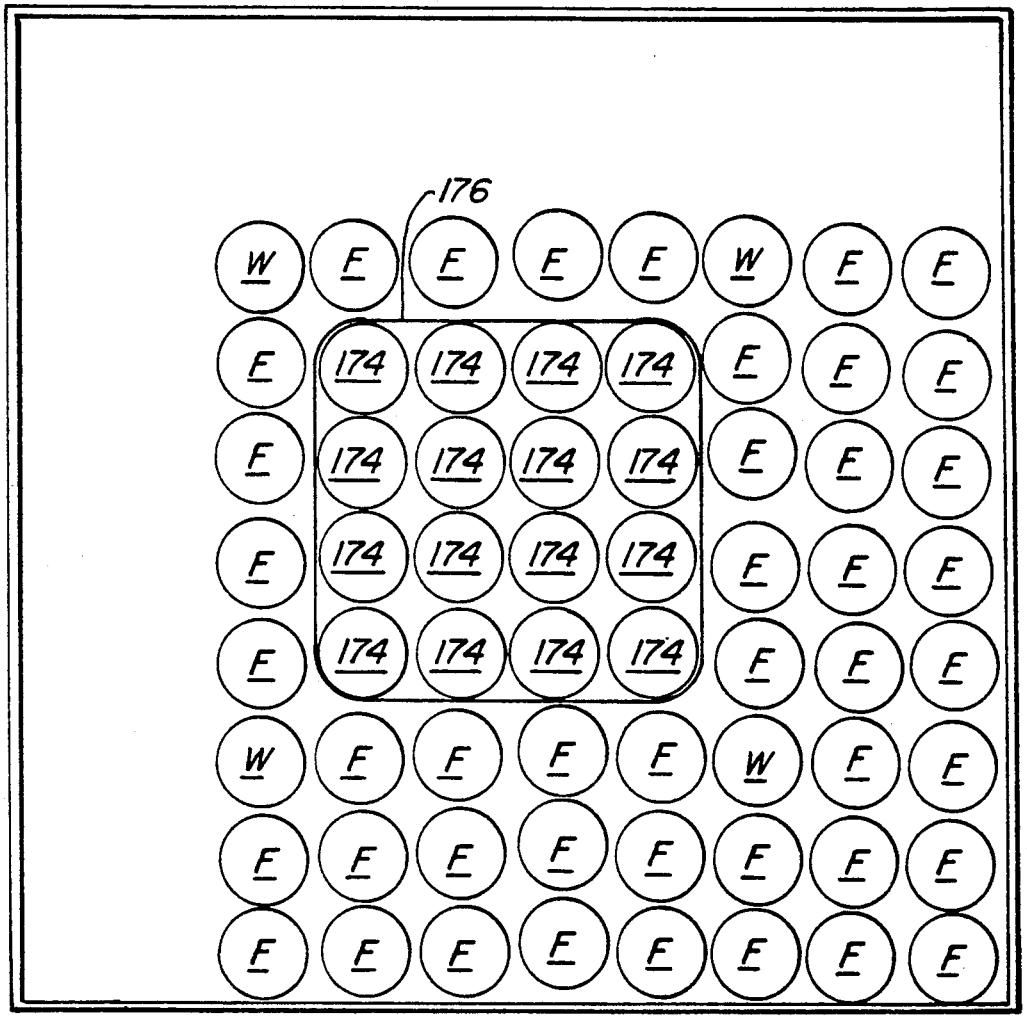
FIG. 24 illustrates a representative fuel assembly configuration wherein water rods are placed adjacent to a removable swirl vane matrix of types as illustrated in FIGS. 12 or 13.

Summarizing the remainder of the specification is beneficial at this juncture. Specifically, FIGS. 10, 11, and 12 disclose various separation devices which may be placed at the end of individual fuel rods. FIGS. 13, 14, 15, 16, and 17 disclose separation devices mounted to spacers. FIGS. 18, 19, and 20 disclose separation devices which can also be mounted to spacers, but preferably pass through the spacers and are suspended form the upper tie plate. FIG. 13 shows a combination of a separation device mounted at the end of a part-length fuel rod as well as a separation device attached to a spacer. FIG. 18 discloses a separation device combined with and extending continuously from the end of a part length rod through overlying spacers. it will be understood that more than one such combined device can be placed in the fuel assembly. FIGS. 16, 17, 19, 20, 21, 22, and 23 disclose arrays of adjacent part length rods with overlying separation devices. Such part length rod arrays can be distributed in various arrangements within the fuel assembly. FIGS. 19, 20, 21, and 22 disclose these separation devices extending through two or more spacers. These extended devices can pass through and be suspended from the upper tie plate to maximize steam venting and allow for top removal of the devices. FIGS. 22, 23, and 24 disclose devices to incorporate water rods within or adjacent to the steam vent volume to improve moderator distribution within the fuel assembly.

Figure 10:
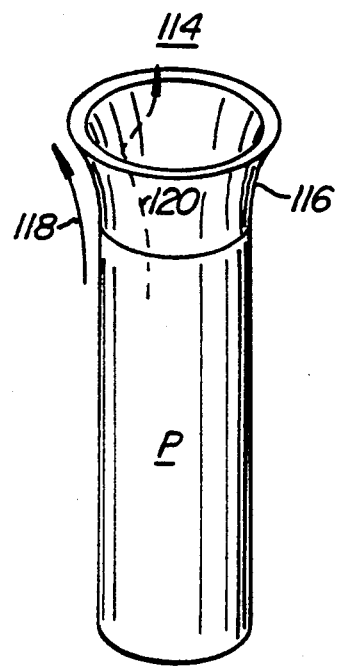
FIG. 10 illustrates a single part length rod with a flared end for deflecting water passing along the outside of the part length rod at the upper end of the part length rod.
Figure 11:
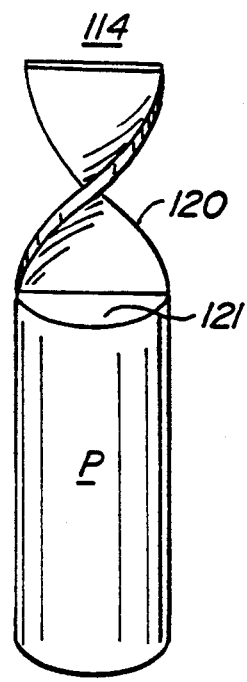
FIG. 11 illustrates a single part length rod with an attached swirl vane for imparting radial velocity to water carried into the volume overlying the part length rod.
Figure 12:
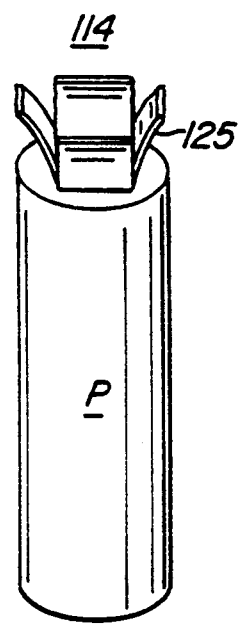
FIG. 12 illustrates a single part length rod with deflector tabs at the top of the rod.
Figure 13:
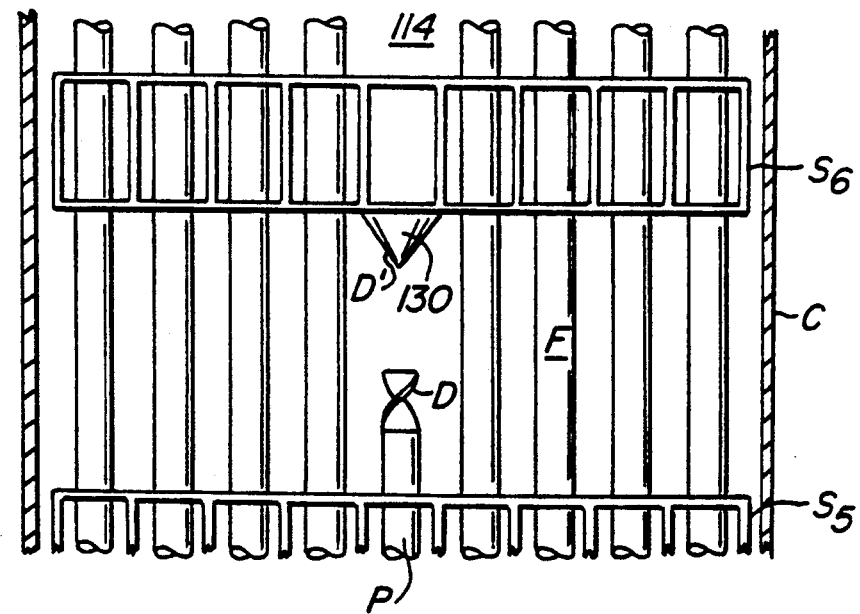
FIG. 13 illustrates a single part length rod in an array of full length rods with a separation device in the form of a cone attached to an overlying spacer.

With reference to FIGS. 10, 11, and 12, the reader will understand that the partial length rod P is the only such rod shown. It will be understood that any one or more of the partial length rods P could be placed in the rod array as illustrated in FIG. 13.

In FIG. 10 the partial length rod P has at the end thereof an outwardly flaring bell-shaped cone 116. The purpose of the cone 116 is to divert upwardly flowing water outwardly and away from volume 114 overlying the part-length rod P; such deflection is illustrated at arrow 118. At the same time, steam 120, having a lighter mass, can divert its flow into the volume 114 overlying the part-length rod.

Referring to FIG. 11, part-length rod P has attached to the end thereof a swirl vane 120 the twist here being oriented over 180° in the counterclockwise direction as the band 120 extends upwardly from the end of the part-length rod 121 into the volume 114 overlying the part-length rod. The function of band 120 is easily understood. It imparts to dense water particles an outward centrifugal vector; steam being of lighter mass continues into the upward volume 114.

Finally, and referring to FIG. 12, part-length rod P is shown with an array of outwardly deflecting tabs 125. Outwardly deflecting tabs 125 have the function of deflecting outwardly the dense water and permitting steam to continue upwardly in an uninterrupted path.

At this point the reader should understand that many other separation devices at the end of the part-length rods can be utilized. All that is required is that the devices be capable of deflecting outwardly the denser water flow while permitting steam to continue vertically upwardly.

Referring to the view of FIG. 13, a part-length rod P termination shortly above a spacer $S_5$ is shown at a section of a fuel bundle similar to that illustrated in FIG. 1. The particular separation device D utilized is similar to those separation devices illustrated in FIGS. 9 and 11.

FIG. 13 shows an additional aspect of this invention. Specifically, spacer $S_6$ is shown supporting a second separation device D', device D' taking the form of a downwardly disposed cone 30. Referring to cone 130, it can be seen that the apex of the cone is disposed towards the partial length rod P; the truncated base of the cone is mounted upwardly into spacer $S_6$ which is the spacer immediately overlying the part-length rod.

The function of the cone is easy to understand. Heavier liquid particles are directed outwardly to the adjacent fuel rods F. Steam continues upwardly in the volume 114 overlying the part-length rod P.

Figure 14:
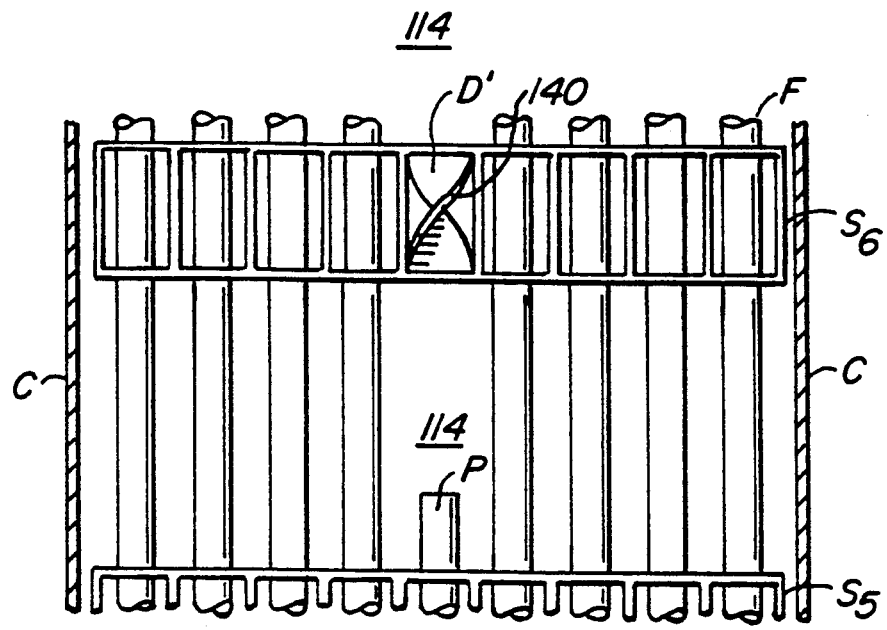
FIG. 14 illustrates a single part length rod with a swirl vane attached to the overlying spacer, the swirl vane having a diameter in the range of the underlying part length rod; and, FIG. 15 illustrates a single part length rod with a swirl vane attached to an overlying spacer, the swirl vane having a diameter exceeding that of the underlying part length rod.
Figure 15:
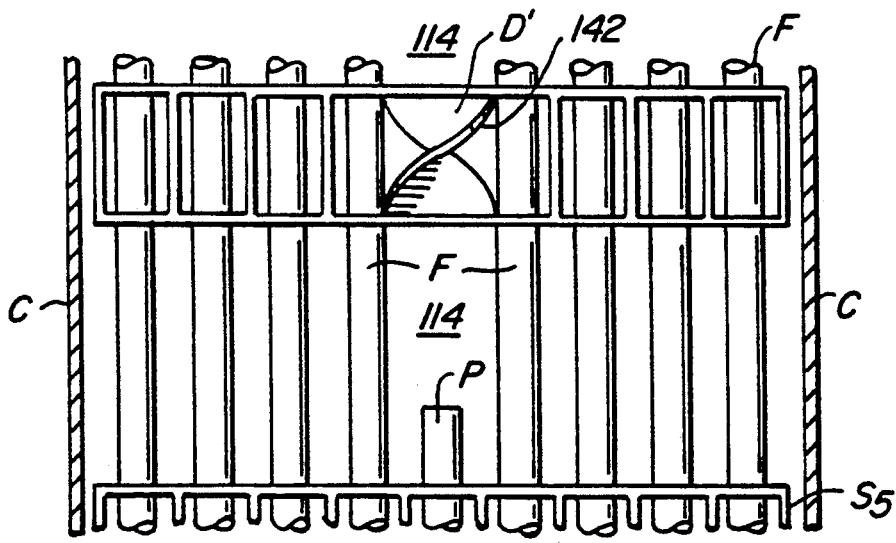

Referring to FIGS. 14 and 15, the disposition of an alternate separation device D' at the spacer $S_6$ is illustrated. In FIG. 6 the matrix defined by the spacer $S_6$ maintains a swirl vane 140. Like the separation device of FIG. 3, swirl vane 140 is twisted over 180° and serves to centrifugally separate water from the volume 114 overlying part-length rod P. It will be understood that separation device D' is effective in separating out water that may be entrained into the steam vent of volume between the part-length rod P and spacer $S_6$.

The construction of FIG. 15 is similar, the only exception being that the swirl vane 142 is of a larger width occupying substantially the full volume within the spacer $S_6$ between the fuel rods F.

Figure 16:
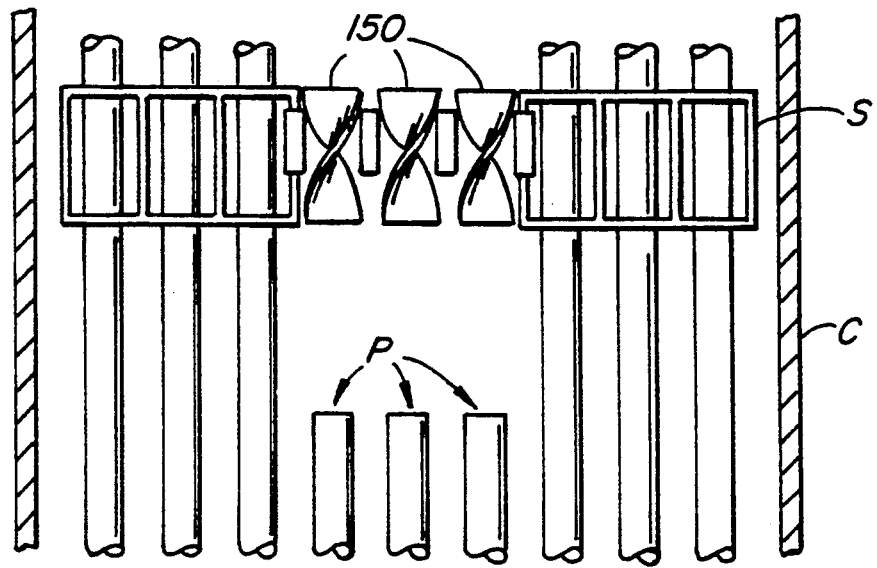
FIG. 16 illustrates an array of adjacent part length rods with a matrix of swirl vanes attached to an overlying spacer, the number of swirl vanes in the matrix being equal to or less than the number of part length rods below.

FIG. 16 illustrates a similar construction, with an array of adjacent part length rods P terminating below spacer S. Spacer S supports an array of overlying swirl vanes 150 at a distance above the ends of part length rods P. As the reader will understand, the disclosed side elevation only illustrates three part length rods and associated swirl vanes. More could be used. For example, a 3 by 3 matrix adjacent of part length rods could be used.

Figure 17:
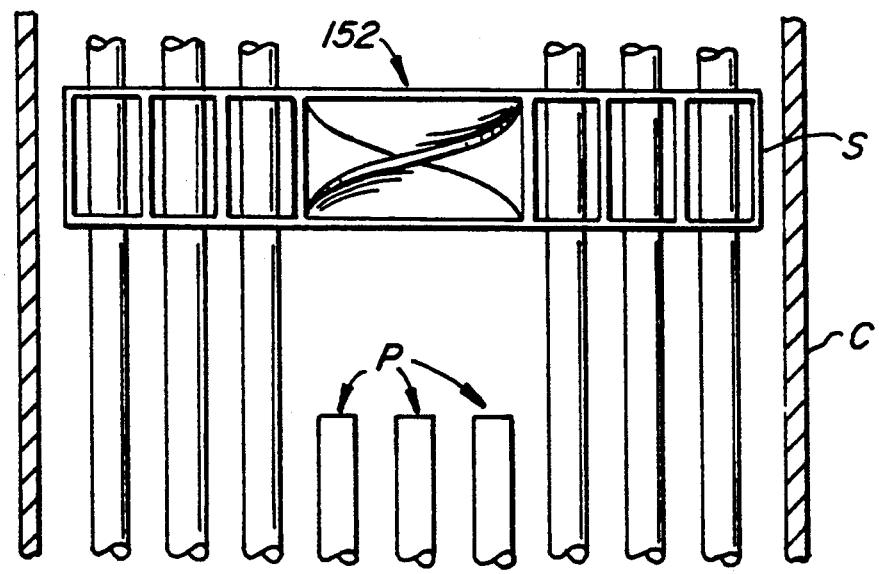
FIG. 17 illustrates an array of adjacent part length rods with a large swirl vane attached to an overlying spacer, the swirl vane having a diameter comparable to the size of the underlying array of part length rods.

FIG. 17 illustrates a similar construction to FIG. 16. Here a larger diameter swirl vane 152 attached to spacers overlies an array of adjacent part length rods P. The part length rods P are configured typically in a 3 by 3 square pattern. More could be used.

FIG. 18 illustrates an extended swirl vane 160 attached to the end of a part length rod. Part length rod P and swirl vane 160 form a unitary structure. This rod P and swirl vane 160 mount in the same manner as the side-by-side full length fuel rod F. Consequently, part length rod P can be removed by grasping swirl vane 160 or any fixture attached to swirl vane 160 for that purpose. The swirl vane can also be constructed with two crossed (cruciform sectioned) metal bands to increase strength for the swirl vane of this design The part length rod and swirl vane are here shown extending between two spacers $S_1$ and $S_2$.

FIG. 19 illustrates a single large swirl vane 162 overlying a number of adjacent part length rods (for example a 3 by 3 matrix of part length rods P). This single large swirl vane 162 is attached between spacers $S_1$ and upper tie plate U. Alternately, provision can be made for attachment of the large swirl vane between two adjacent spacers (See FIG. 18). Provision of an opening for this device to pass through the upper tie plate U maximizes the steam venting effectiveness of this design. Mounting the device to the upper tie plate allows for removal of the device from the top, thus providing access to the part length rods underlying the device.

The construction of FIG. 20 is similar, except the single large swirl vane device is replaced with a unitized matrix of smaller swirl vanes. The matrix of swirl vanes here shown and here illustrated is 3 by 3. This unitized matrix is illustrated with surrounding bands 168 to provide positioning at the fuel assembly spacers $S_1$. This device preferably passes through and is suspended from the upper tie plate U.

Figure 21:
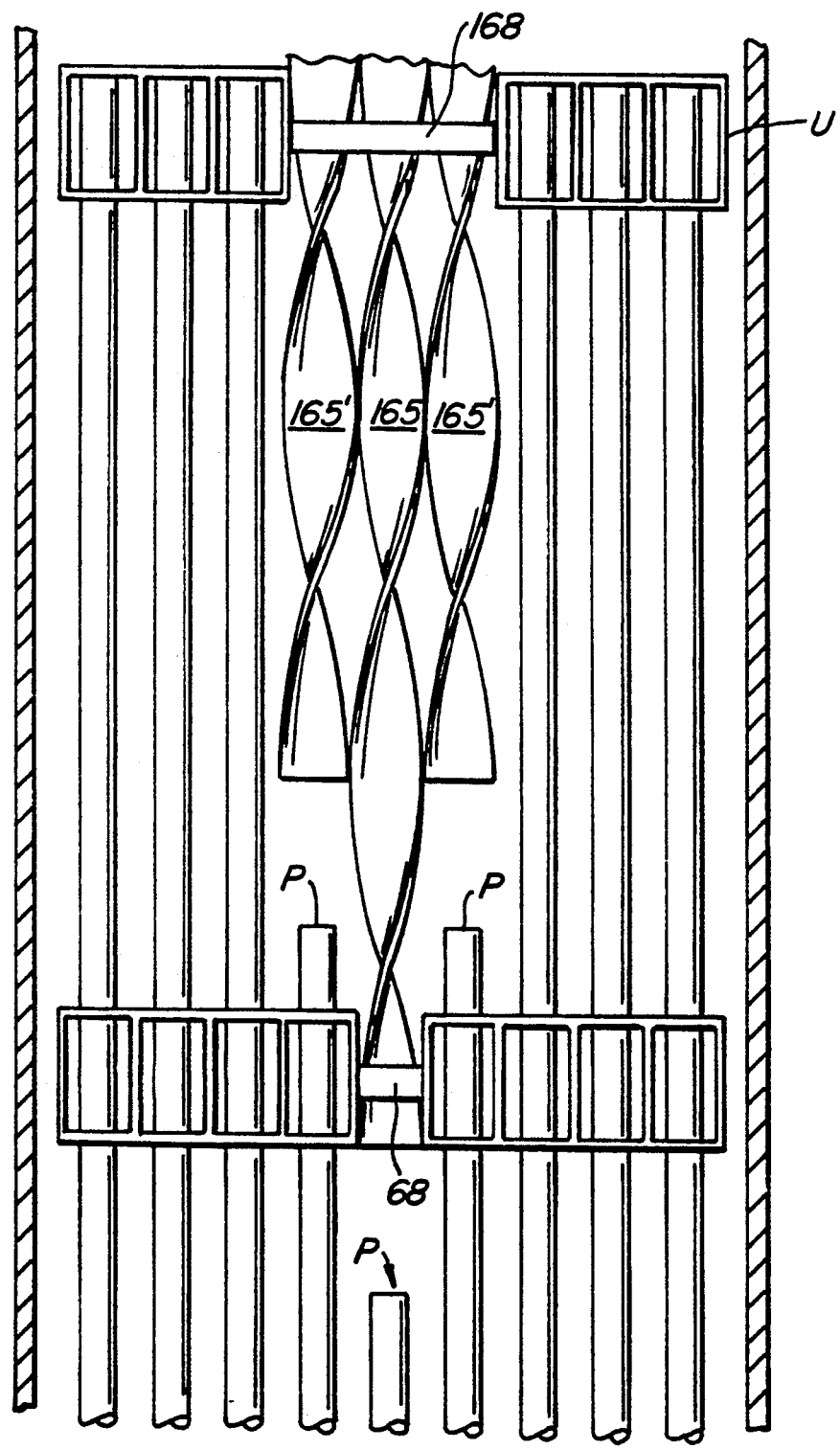
FIG. 21 illustrates an array of adjacent part length fuel rods of unequal length with an overlying matrix of swirl vanes that extend axially between spacers, the number of swirl vanes in the matrix being equal to or less than the number of part length rods below.

The construction of FIG. 21 is similar, except the underlying part length rods P are of unequal height. Consequently, the overlying unitized matrix of swirl vanes 165, 165' is of unequal length.

The large steam vent volume may reduce local neutron moderation. Therefore, it may be necessary to improve moderator distribution by incorporating additional water into the central portion of the fuel assembly. FIGS. 22, 23, and 24 disclose devices wherein water rods are incorporated to the swirl vane structure of this invention.

FIG. 22 illustrates an alternate construction for the large swirl vane of FIG. 11, wherein a central water rod W is placed integral with the swirl vane 170. The underlying central part length rod is removed to allow for downward extension of the water rod W. The water rod W is shown the same diameter of the fuel rods F and part length rods P; other so-called large water rods W may be used where the diameter exceeds the diameter of the fuel rods F.

FIG. 23 shows similar construction for a water rod integral within a unitized swirl vane matrix 172.

FIG. 24 illustrates a representative fuel assembly configuration using a swirl vane matrix 176 with individual swirl vanes 174 such as illustrated in FIG. 20 or FIG. 21. Water rods W are placed adjacent to the removable swirl vane matrix 176. Such placement of water rods also allows for standard axial positioning of the fuel assembly spacers $S_1$ and $S_2$ (See FIG. 23).

The reader will understand that in my description of separation devices D', I contemplate any type of separation device overlying the part-length rod, this separation device acting to eject either entering or entrained water from the void volume overlying the end of the part-length rod.

What is claimed is:

1. In a boiling water reactor having discrete bundles of fuel rods confined within channel enclosed fuel assemblies wherein said fuel bundle includes:

a plurality of fuel rods for placement within said channel, each said fuel rod containing fissile material for producing nuclear reaction when in the presence of sufficient moderating water coolant and moderated neutrons;

a lower tie plate for supporting said bundle of fuel rods within said channel, said lower tie plate joining the bottom of said channel to close the bottom end of said channel, said lower tie plate providing defined apertures for the inflow of water coolant in said channel between said fuel rods for generation of steam during said nuclear reaction;

said plurality of fuel rods extending from said lower tie plate wherein a single phase region of said water in said bundle is defined to an upward portion of said bundle wherein a annular flow regime of said water and steam in said bundle is defined during nuclear steam generating reaction in said fuel bundle;

an upper tie plate for supporting the upper end of said bundle of fuel rods, said upper tie plate joining the top of said channel, said upper tie plate providing apertures for the outflow of water and generated steam in said channel during said nuclear reaction;

spacers intermediate said upper and lower tie plates at preselected elevations along said fuel rods for maintaining said fuel rods in spaced apart location along the length of said fuel assembly including a first group of spacers in said lower region of said fuel bundle and a second group of spacers in said upper annular flow regime of said fuel bundle;

a plurality of said fuel rods being part length fuel rods extending from said lower tie plate towards said upper tie plate, said partial length fuel rods terminating at ends within the upper region of said fuel bundle before reaching said upper tie plate and causing deceased pressure drop in said annular flow regime of said fuel bundle during said nuclear steam generating reaction;

the improvement to said bundle comprising:

means in the annular flow regime of said fuel bundle for restoring at least some of the decreased pressure drop realized by said part length fuel rods whereby improved critical power performance is achieved at said fuel bundle having said part length fuel rods.

2. The invention of claim 1 and wherein said means in the annular flow regime of said fuel bundle for restoring at least some of the decreased pressure drop realized by said part length fuel rods restores part but not all of said decreased pressure drop realized by said part length fuel rods.

3. The invention of claim 1 and wherein said means in the annular flow regime of said fuel bundle for restoring at least some of the decreased pressure drop realized by said part length fuel rods includes decreased spacer pitch in the upper two phase region of said fuel bundle.

4. The invention of claim 1 and wherein said means in the annular flow regime of said fuel bundle for restoring at least some of the decreased pressure drop realized by said part length fuel rods includes vanes attached to said spacers.

5. The invention of claim 3 and wherein said second group of spacers has decreasing pitch progressively upward of the upper two phase region of said bundle.

6. The invention of claim 1 and wherein said means in the annular flow regime of said fuel bundle for restoring at least some of the decreased pressure drop realized by said part length fuel rods includes swirl vanes.

7. The invention of claim 1 and wherein said means in the annular flow regime of said fuel bundle for restoring at least some of the decreased pressure drop realized by said part length fuel rods includes spacers having increased vertical height.

8. The invention of claim 1 and wherein said means in the annular flow regime of said fuel bundle for restoring at least some of the decreased pressure drop realized by said part length fuel rods is attached to the end of said part length rod.

9. The invention of claim 1 and wherein said means in the annular flow regime of said fuel bundle for restoring at least some of the decreased pressure drop realized by said part length fuel rods is attached to one of said spacers.

10. The invention of claim 1 and wherein said means in the annular flow regime of said fuel bundle for restoring at least some of the decreased pressure drop realized by said part length fuel rods is attached to said upper tie plate.

11. The invention of claim 1 and wherein said means in the annular flow regime of said fuel bundle for restoring at least some of the decreased pressure drop realized by said part length fuel rods includes a cone, said cone disposed with the apex there of is downward disposed to and towards the end of said part length rod.

12. The invention of claim 1 and wherein a plurality of part length rods are placed within said fuel bundle and said means in the annular flow regime of said fuel bundle for restoring at least some of the decreased pressure drop realized by said part length fuel rods overlies more than one of said part length rods.

13. The invention of claim 1 and wherein said upper tie plate defines an aperture and said means in the annular flow regime of said fuel bundle for restoring at least some of the decreased pressure drop realized by said part length fuel rods passes through said upper tie plate at said aperture.

14. The invention of claim 1 and wherein said means in the annular flow regime of said fuel bundle for restoring at least some of the decreased pressure drop realized by said part length fuel rods is attached to a water rod.

15. In a boiling water reactor having discrete bundles of fuel rods confined within channel enclosed fuel assemblies wherein said fuel bundle includes:
a plurality of fuel rods for placement within said channel, each said fuel rod containing fissile material for producing nuclear reaction when in the presence of sufficient moderating water coolant and moderated neutrons;
a lower tie plate for supporting said bundle of fuel rods within said channel, said lower tie plate joining the bottom of said channel to close the bottom end of said channel, said lower tie plate providing defined apertures for the inflow of water coolant in said channel between said fuel rods for generation of steam during said nuclear reaction;
said plurality of fuel rods extending from said lower tie plate wherein a single phase region of said water in said bundle is defined to an upward portion of said bundle wherein a annular flow regime of said water and steam in said bundle is defined during nuclear steam generating reaction in said fuel bundle;
an upper tie plate for supporting the upper end of said bundle of fuel rods, said upper tie plate joining the top of said channel, said upper tie plate providing apertures for the outflow of water and generated steam in said channel during said nuclear reaction;
spacers intermediate said upper and lower tie plates at preselected elevations along said fuel rods for maintaining said fuel rods in spaced apart location along the length of said fuel assembly including a first group of spacers in said lower region of said fuel bundle and a second group of spacers in said upper annular flow regime of said fuel bundle;
a plurality of said fuel rods being part length fuel rods extending from said lower tie plate towards said upper tie plate, said partial length fuel rods terminating at ends within the upper region of said fuel bundle before reaching said upper tie plate and causing deceased pressure drop in said annular flow regime of said fuel bundle during said nuclear steam generating reaction;
the improvement to said bundle comprising:
means associated with at least some of said second group of spacers in the annular flow regime of said fuel bundle for restoring at least some of the decreased pressure drop realized by said part length fuel rods whereby improved critical power performance is achieved at said fuel bundle having said part length fuel rods.

16. The invention of claim 15 and wherein said means associated with at least some of said second group of spacers restores part but not all of said decreased pressure drop realized by said part length fuel rods.

17. The invention of claim 15 and wherein said means associated with at least some of said second group of spacers includes decreased spacer pitch in the annular flow regime of said fuel bundle.

18. The invention of claim 15 and wherein said means associated with at least some of said second group of spacers includes vanes attached to said spacers.

19. The invention of claim 17 and wherein said second group of spacers has decreasing pitch progressively upward of the annular flow regime of said bundle.

20. The invention of claim 15 and wherein said means associated with at least some of said second group of spacers includes swirl vanes.

21. The invention of claim 15 and wherein said means associated with at least some of said second group of spacers includes spacers having increased vertical height.

22. In a boiling water reactor having discrete bundles of fuel rods confined within channel enclosed fuel assemblies wherein said fuel bundle includes:
a plurality of fuel rods for placement within said channel, each said fuel rod containing fissile material for producing nuclear reaction when in the presence of sufficient moderating water coolant and moderated neutrons;
a lower tie plate for supporting said bundle of fuel rods within said channel, said lower tie plate joining the bottom of said channel to close the bottom end of said channel, said lower tie plate providing defined apertures for the inflow of water coolant in said channel between said fuel rods for generation of steam during said nuclear reaction;
said plurality of fuel rods extending from said lower tie plate wherein a single phase region of said water in said bundle is defined to an upward portion of said bundle wherein an annular flow regime of said water and steam in said bundle is defined during nuclear steam generating reaction in said fuel bundle;
an upper tie plate for supporting the upper end of said bundle of fuel rods, said upper tie plate joining the top of said channel, said upper tie plate providing apertures for the outflow of water and generated steam in said channel during said nuclear reaction;
spacers intermediate said upper and lower tie plates at preselected elevations along said fuel rods for maintaining said fuel rods in spaced apart location along the length of said fuel assembly including a first group of spacers in a lower region of said fuel bundle and a second group of spacers in said annular flow regime of said fuel bundle;

a plurality of said fuel rods being part length fuel rods extending from said lower tie plate towards said upper tie plate, said partial length fuel rods terminating within the upper region of said fuel bundle before reaching said upper tie plate and causing deceased pressure drop in said upper annular flow regime of said fuel bundle during said nuclear steam generating reaction;

the improvement to the distribution of said bundle comprising:

said spacers of said first group of spacers having at least one first vertical distribution in a first lower portion of said assembly in a first vertical interval;

said spacers of said second group having at least one second and smaller vertical distribution in said annular flow regime of said fuel bundle to restore at least some of said decreased pressure drop in said upper annular flow regime of said fuel bundle whereby the spacers having at least one second and smaller vertical distribution present improved critical power in the upper annular flow regime of said bundle.

23. The invention of claim 22 and wherein said matrix is a 10 by 10 matrix.

24. The invention of claim 22 and including up to twelve part length rods.

25. The invention of claim 22 and wherein said spacers include ferrule spacers.

26. The invention of claim 22 and where the upper most spacer in said second group of spacers is an inconel spacer having low pressure drop and minimal pressure drop on the passing annular flow regime in said upper two phase region of said fuel bundle.

27. The invention of claim 22 and including:

at least one large water rod extending in said fuel bundle having moderator contained therein for providing to said upper two-phase region of said fuel bundle additional moderator for moderating reaction produced fast neutrons to reaction continuing thermal neutrons, said large water rod occupying a portion of the fuel rod positions in said fuel rod matrix.

28. In a boiling water reactor having discrete bundles of fuel rods confined within channel enclosed fuel assemblies an improved fuel bundle comprising:

a plurality of fuel rods for placement within said channel, each of said fuel rods containing fissile material for producing nuclear reaction when the presence of sufficient water coolant and moderated neutrons;

a lower tie plate for supporting said bundle of fuel rods within said channel, said lower tie plate joining the bottom of said channel close to said channel, said lower tie plate providing defined apertures for the inflow of water in said channel between said fuel rods for the generation of steam during said nuclear reaction;

said plurality of fuel rods extending from said lower tie plate wherein a single phase region of water in said bundle is defined to an upward portion of said bundle wherein an annular flow regime of water and steam in said bundle is defined during nuclear steam generating reaction in said fuel bundle;

an upper tie plate for supporting the upper end of said bundle of fuel rods, said upper tie plate joining the top of said channel, said upper tie plate providing defined the apertures for the outflow of water and steam in said channel from the generation of steam during said nuclear reactions;

a plurality of said fuel rods being part length fuel rods extending from said lower tie plate towards said upper tie plate, said part length fuel rods terminating within the upper region of said bundle before reaching said upper tie plate and causing deceased pressure drop in said upper annular flow regime of said fuel bundle during said nuclear steam generation reaction;

spacers intermediate said upper and lower tie plate at preselected elevations along said fuel rods for maintaining said fuel rods in spaced apart location along the length of said fuel assembly, said spacers including a first group of spacers in said lower region of said fuel bundle and a second group of spacers in said upper annular flow regime of said fuel bundle;

said spacers of said first group having at least one first vertical distribution from said lower tie plate in said lower region of said fuel bundle;

said spacers of said second group having at least one second and smaller vertical distribution in said upper annular flow regime of said fuel bundle to said upper tie plate whereby the spacers present above said part length fuel rod restores pressure drop and improves the critical power in the upper annular flow regime of said fuel bundle.

29. The invention of claim 28 and wherein said matrix is a 10×10 matrix.

30. The invention of claim 28 and wherein all said part length rods are of different lengths.

31. The invention of claim 28 and wherein said part length rods have one full length rod between said part length rods in said channel.

32. The invention of claim 28 and wherein said spacers include ferrule spacers.

33. The invention of claim 28 and where the upper most spacer in said bundle is an inconel spacer having low pressure drop and minimal pressure drop on the passing two phase flow in said upper two phase region of said fuel bundle.

34. The invention of claim 28 and including:

at least one large water rod extending in said fuel bundle having moderator contained therein for providing to said upper two-phase region of said fuel bundle additional moderator for moderating reaction produced fast neutrons to reaction continuing thermal neutrons, said large water rod occupying a portion of the fuel rod positions in said fuel rod matrix.

35. In a boiling water reactor having discrete bundles of fuel rods confined within channel enclosed fuel assemblies, wherein said fuel bundle includes:

a fuel channel having vertically extending walls forming a continuous channel around a fuel assembly volume, said channel being open at the bottom end for engagement to a lower tie plate and open at the upper end for engagement to an upper tie plate;

a plurality of rods for placement within said channel, each said rod containing fissile material for producing nuclear reaction when in the presence of water coolant;

a lower tie plate for supporting said bundle of rods within said channel, said lower tie plate joining the bottom of said channel to close the bottom end of said channel, said lower tie plate providing defined apertures for the inflow of water in said channel between said rods for generation of steam during said nuclear reaction;

said plurality of fuel rods extending from said lower tie plate to an upward portion of said bundle wherein an annular flow regime of said water and steam in said bundle is defined during nuclear steam generating reaction in said fuel bundle;

an upper tie plate for supporting the upper end of said bundle of rods, said upper tie plate joining the top of said channel to close the top end of said channel, said upper tie plate providing apertures for the outflow of water and steam in said channel from a generation of steam during said nuclear reaction;

spacers intermediate said upper and lower tie plates at preselected elevations along said fuel rods for maintaining said fuel rods in spaced apart location along the length of said fuel assembly, said spacers including a first group of spacers in said lower region of said fuel bundle and a second group of spacers in said upper annular flow regime of said fuel bundle;

a plurality of said fuel rods being part length fuel rods extending from said lower tie plate towards said upper tie plate, said partial length rods terminating within the annular flow regime of said fuel bundle before reaching said upper tie plate and causing deceased pressure drop in said upper annular flow regime of said fuel bundle;

the improvement to said spacer distribution comprising:
  a plurality of said second group of spacers in said upper annular flow regime of said fuel bundle having swirl vanes attached to said spacers to restore at least some of said decreased pressure drop in the upper annular flow regime of the fuel bundle whereby the critical power of said fuel bundle is improved.

36. The invention of claim 35 and wherein said second group of spacers with said swirl vanes in the upper annular flow regime of said fuel bundle has the same pitch as said spacers without said swirl vanes.

37. The invention of claim 35 and wherein said second group of spacers with said swirl vanes in the upper annular flow regime of said fuel bundle has an decreased pitch over said spacers without said swirl vanes.

38. The invention of claim 35 and wherein said matrix is a 10 by 10 matrix.

39. The invention of claim 35 and including up to twelve part length rods.

40. The invention of claim 38 and including up to twelve part length rods.

41. The invention of claim 35 and wherein said spacers include ferrule spacers.

42. The invention of claim 35 and wherein the upper spacer in said fuel bundle does not incorporate swirl vanes.

43. The invention of claim 35 and where the upper most spacer in said bundle is an inconel spacer having low pressure drop and minimal pressure drop on the passing two phase flow in said upper two phase region of said fuel bundle.

44. The invention of claim 35 and including:
at least one large water rod extending in said fuel bundle having moderator contained therein for providing to said upper two-phase region of said fuel bundle additional moderator for moderating reaction produced fast neutrons to reaction continuing thermal neutrons, said large water rod occupying a portion of the fuel rod positions in said fuel rod matrix.

45. In a boiling water reactor having discrete bundles of fuel rods confined within channel enclosed fuel assemblies, an fuel bundle comprising:

a fuel channel having vertically extending walls forming a continuous channel around a fuel assembly volume, said channel being open at the bottom end for engagement to a lower tie plate and open at the upper end for engagement to an upper tie plate;

a plurality of fuel rods for placement within said channel, each of said fuel rods containing fissile material for producing nuclear reaction when the presence of sufficient moderating water coolant;

a lower tie plate for supporting said bundle of rods within said channel, said lower tie plate joining the bottom of said channel close to said channel, said lower tie plate providing defined apertures for the inflow of water in said channel between said rods for the generation of steam during said nuclear reaction;

said plurality of fuel rods extending from said lower tie plate to an upward portion of said bundle wherein an annular flow regime of water and steam in said bundle is defined during nuclear steam generating reaction in said fuel bundle;

an upper tie plate for supporting the upper end of said bundle of rods, said upper tie plate joining the top of said channel to close the top end of said channel, said upper tie plate providing defined the apertures for the outflow of water and steam in said channel from the generation of steam during said nuclear reactions;

at least one large water rod extending in said fuel bundle having moderator contained therein for providing to said upper annular flow regime of said fuel bundle additional moderator for moderating reaction produced fast neutrons to reaction continuing thermal neutrons, said large water rod occupying a portion of the fuel rod positions in said fuel rod matrix;

a plurality of said fuel rods being part length fuel rods extending from said lower tie plate towards said upper tie plate, said part length rods terminating within the annular flow regime of said bundle before reaching said upper tie plate to produce deceased pressure drop in said upper annular flow regime of said fuel bundle;

spacers intermediate said upper and lower tie plate at preselected elevations along said fuel rods for maintaining said fuel rods in spaced apart location along the length of said fuel assembly including a first group of spacers in said lower region of said fuel bundle and a second group of spacers in said upper annular flow regime of said fuel bundle;

improvement to said spacers comprising in combination:

said second group of spacers in said upper annular flow regime of said fuel bundle including swirl vanes to restore at least some of said decreased pressure drop whereby the critical power of said fuel bundle is enhanced.

46. The invention of claim 45 and wherein said spacers in said second group of spacers with said swirl vanes in the annular flow regime of said fuel bundle has the same pitch as said spacers without said swirl vanes.

47. The invention of claim 45 and wherein said spacers of said second group of spacers with said swirl vanes in the upper annular flow regime of said fuel bundle has an increased pitch over said spacers without said swirl vanes.

48. The invention of claim 45 and wherein said spacers include ferrule spacers.

49. The invention of claim 45 and where the upper most spacer in said bundle is an inconel spacer having low pressure drop and minimal pressure drop on the passing two phase flow in said upper two phase region of said fuel bundle.

50. The invention of claim 45 and including:
at least one large water rod extending in said fuel bundle having moderator contained therein for providing to said upper two-phase region of said fuel bundle additional moderator for moderating reaction produced fast neutrons to reaction continuing thermal neutrons, said large water rod occupying a portion of the fuel rod positions in said fuel rod matrix.

51. In the combination of a fuel bundle for a boiling water nuclear reactor, said fuel bundle including; a lower tie plate for supporting a matrix of vertically upstanding fuel rods and defining apertures for the inflow of water to said fuel bundle; an upper tie plate for maintaining said matrix of fuel bundles in vertical upstanding relation and defining apertures for permitting the outflow of water and generated steam; a channel surrounding said fuel bundle and extending from said lower tie plate to said upper tie plate for confining fluid flow between said tie plates and through said matrix of fuel rods; a plurality of spacers within said channel and around said fuel rods for maintaining the side-by-side spacing of said fuel rods between said tie plates; at least one of said fuel rods being a part length fuel rod resting on and supported by said lower tie plate and terminating at an upper end below said upper tie plate, said part length rod defining with respect to surrounding full length rods a void volume overlying said part length rod for defining a steam vent path between the upper end of said part length rod and said upper end of said fuel bundle, the improvement to said fuel bundle comprising:
a separation device supported by said fuel bundle and placed in said steam vent path overlying said part length rod and under said tie plate;
said separation device defining means for deflecting water from said steam vent path to said surrounding full length rods.

52. The invention of claim 51 and wherein said separation device is attached to the end of said part length rod.

53. The invention of claim 51 and wherein said separation device is attached to one of said spacers.

54. The invention of claim 51 and wherein said separation device is attached to said upper tie plate.

55. The invention of claim 51 and wherein said separation device includes a swirl vane.

56. The invention of claim 51 and wherein said separation device includes deflecting tabs.

57. The invention of claim 51 and wherein said separation device includes a cone, said cone disposed with the apex there of is downward disposed to and towards the end of said part length rod.

58. The invention of claim 51 and wherein a plurality of part length rods are placed within said fuel bundle and a separation device overlies more than one of said part length rods.

59. The invention of claim 58 and wherein a corresponding plurality of separation devices overlie said part length rods.

60. The invention of claim 51 and wherein said upper tie plate defines an aperture and said separation device passes through said upper tie plate at said aperture.

61. The invention of claim 51 and wherein said separation device includes a water rod with said separation device.

62. In the combination of a fuel bundle for a boiling water nuclear reactor, said fuel bundle including;
a lower tie plate for supporting a matrix of vertically upstanding fuel rods and defining apertures for the inflow of water to said fuel bundle;
an upper tie plate for maintaining said matrix of fuel bundles in vertical upstanding relation and defining apertures for permitting the outflow of water and generated steam;
a channel surrounding said fuel bundle and extending from said lower tie plate to said upper tie plate for confining fluid flow between said tie plates and through said matrix of fuel rods;
a plurality of spacers within said channel and around said fuel rods for maintaining the side-by-side spacing of said fuel rods between said tie plates;
at least one of said fuel rods being a part length fuel rod resting on and supported by said lower tie plate and terminating at an upper end below said upper tie plate, said part length rod defining with respect to surrounding full length rods a void volume overlying said part length rod for defining a steam vent path between the upper end of said part length rod and said upper tie plate;
a separation device supported by said fuel bundle and placed in said steam vent path overlying said part length rod, said separation device defining means for deflecting water from said steam vent path to said surrounding full length rods.

63. The invention of claim 62 and wherein said separation device is attached to the end of said part length rod.

64. The invention of claim 62 and wherein said separation device is attached to one of said spacers.

65. The invention of claim 62 and wherein said separation device includes a swirl vane.

66. The invention of claim 62 and wherein said separation device includes deflecting tabs.

67. The invention of claim 62 and wherein said separation device includes a cone, said cone disposed with the apex there of downward disposed to and towards the end of said part length rod.

68. The invention of claim 62 and wherein a plurality of part length rods are placed within said fuel bundle and a separation device overlies more than one of said part length rods.

69. The invention of claim 68 and wherein a corresponding plurality of separation devices overlie said part length rods.

70. The invention of claim 62 and wherein said upper tie plate defines an aperture and said separation device passes through said upper tie plate at said aperture.

71. The invention of claim 62 and wherein said separation device include a water rod.

* * * * *

(12) EX PARTE REEXAMINATION CERTIFICATE (5387th)
United States Patent
Johansson et al.

(10) Number: US 5,229,068 C1
(45) Certificate Issued: Jun. 6, 2006

(54) OPTIMIZED CRITICAL POWER IN A FUEL BUNDLE WITH PART LENGTH RODS

(75) Inventors: Eric B. Johansson, Wrightsville Beach, NC (US); Bruce Matzner, San Jose, CA (US); Gary E. Dix, Saratoga, CA (US); Richard A. Wolters, Jr., San Jose, CA (US); Anthony P. Reese, San Jose, CA (US)

(73) Assignee: General Electric Company

Reexamination Request:
No. 90/005,098, Sep. 3, 1998

Reexamination Certificate for:
Patent No.: 5,229,068
Issued: Jul. 20, 1993
Appl. No.: 07/914,389
Filed: Jul. 15, 1992

Related U.S. Application Data

(63) Continuation-in-part of application No. 07/701,931, filed on May 17, 1991, now abandoned, and a continuation-in-part of application No. 07/702,644, filed on May 17, 1991, now abandoned.

(51) Int. Cl.
*G21C 19/28* (2006.01)

(52) U.S. Cl. .................. 376/371; 376/439; 376/443; 376/377; 376/435

(58) Field of Classification Search ................ 376/439, 376/438, 435, 443, 444, 441, 442
See application file for complete search history.

(56) References Cited

U.S. PATENT DOCUMENTS

| | | | |
|---|---|---|---|
| 3,070,537 A | 12/1962 | Treshow | 204/193.2 |
| 3,132,998 A | 5/1964 | Long et al. | 176/43 |
| 3,310,474 A | 3/1967 | Saunders | 176/76 |
| 3,344,855 A | 10/1967 | Clark | |
| 3,420,737 A | 1/1969 | Marchal et al. | 176/570 |
| 3,629,065 A | 12/1971 | Knox | 176/54 |
| 3,764,470 A * | 10/1973 | Calvin | 176/76 |

(Continued)

FOREIGN PATENT DOCUMENTS

| | | |
|---|---|---|
| DE | 3645230 C2 | 12/1986 |
| EP | 0146896 A2 | 12/1984 |
| EP | 0260602 A2 | 9/1987 |
| EP | 0336203 A2 | 3/1989 |
| EP | 0433620 A1 | 10/1990 |

(Continued)

OTHER PUBLICATIONS

English language abstract of Japanese 1–138493 (A).

(Continued)

*Primary Examiner*—Jack Keith

(57) ABSTRACT

In a fuel bundle for use in the core of a boiling water nuclear reactor, part length rods having a tendency to reduce pressure drop are used in combination with spacers and spacer attached devices tending to restore pressure drop to improve critical power. The addition of the part length rods has the advantage of lowering the pressure drop. Attached devices substantially recapture the pressure drop. Exemplary spacer attached mechanisms for the recapture of pressure drop are set forth including vanes—preferably swirl vanes on the spacers, decreasing the spacer pitch to increase the total number of spacers in the upper two phase region of the fuel bundle, increasing the vertical height of the spacers, and increasing the thickness of the metal from which the spacers are constructed. Two classes of separation devices are disclosed for placement in the volume overlying the end of the partial length fuel rods. A first type of device fits to the end of the part length rods and is primarily intended for preventing water passing along the surface of the part length rod adjacent the end of the part length rod from entering the volume overlying the part length fuel rod. A second type of device resides in the volume overlying the part length rod. In either case, critical power is improved.

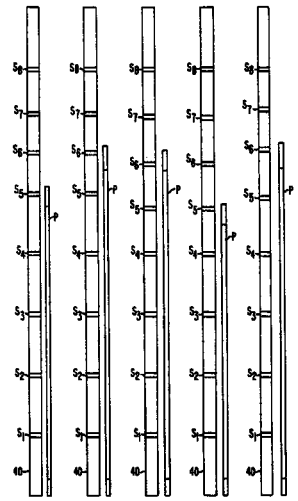

U.S. PATENT DOCUMENTS

| | | | |
|---|---|---|---|
| 3,787,285 A | 1/1974 | Marstrand | 176/78 |
| 3,809,609 A | 5/1974 | Krawiec et al. | |
| 3,886,038 A | 5/1975 | Raven | |
| 4,039,379 A | 8/1977 | Patterson et al. | |
| 4,155,807 A * | 5/1979 | Schreiber et al. | 376/438 |
| 4,357,298 A * | 11/1982 | Wolters, Jr. et al. | 376/438 |
| 4,544,522 A | 10/1985 | Curulla et al. | |
| 4,666,663 A | 5/1987 | Steinke | |
| 4,675,154 A | 6/1987 | Nelson et al. | 376/444 |
| 4,692,302 A | 9/1987 | DeMario et al. | |
| 4,698,204 A | 10/1987 | Taleyarkhan | |
| 4,705,663 A | 11/1987 | Steven et al. | |
| 4,725,403 A | 2/1988 | Buettiker | |
| 4,726,926 A | 2/1988 | Patterson et al. | |
| 4,728,489 A * | 3/1988 | Hatfield | 376/439 |
| 4,728,490 A | 3/1988 | Taleyarkham | |
| 4,758,403 A | 7/1988 | Noailly | |
| 4,804,516 A | 2/1989 | Thomazet et al. | |
| 4,827,063 A | 5/1989 | Bökers et al. | 376/439 |
| 4,844,860 A | 7/1989 | Hatfield | |
| 4,844,861 A * | 7/1989 | Leclercq | 376/439 |
| 4,879,090 A | 11/1989 | Perrotti et al. | |
| 4,968,479 A | 11/1990 | Ogiya et al. | 376/428 |
| 4,970,048 A | 11/1990 | Noailly | |
| 4,999,153 A | 3/1991 | Johansson et al. | |
| 5,017,332 A | 5/1991 | Dix et al. | 376/370 |
| 5,024,810 A | 6/1991 | Bachman | |
| 5,068,082 A | 11/1991 | Ueda et al. | 376/408 |
| 5,080,858 A | 1/1992 | Nylund | |
| 5,089,221 A | 2/1992 | Jonansson et al. | |
| 5,091,146 A | 2/1992 | Dix | 376/443 |
| 5,112,571 A | 5/1992 | Orii et al. | 376/439 |
| 5,130,082 A | 7/1992 | Oosterkamp | 376/371 |
| 5,164,155 A | 11/1992 | Wolters et al. | 376/441 |
| 5,186,891 A | 2/1993 | Johansson et al. | 376/438 |
| 5,263,072 A | 11/1993 | Canat et al. | |
| 5,272,741 A * | 12/1993 | Masuhara et al. | 376/439 |

FOREIGN PATENT DOCUMENTS

| | | | | |
|---|---|---|---|---|
| EP | 0 237 064 B1 | | 3/1991 | |
| EP | 0 428 092 A1 | | 5/1991 | |
| EP | 0 428 093 A1 | | 5/1991 | |
| GB | 1105289 | | 8/1965 | |
| JP | 9128482 | * | 7/1984 | 376/439 |
| JP | 2126388 | * | 6/1987 | 376/438 |
| JP | 2192690 | * | 8/1987 | 376/438 |
| JP | 3149592 | * | 6/1988 | 376/438 |
| JP | 1138493 | * | 5/1989 | 376/439 |
| JP | 3-51796 | | 7/1989 | |
| JP | 1-176986 | | 7/1989 | |
| JP | 61-212789 | | 9/1996 | |
| JP | 63-144290 | | 6/1998 | |

OTHER PUBLICATIONS

Vollradt, "*Sledewasserreaktor mit Wendeln zwischen den Brennstoffstëben*", Atomwirtschaft, Dec. 1967, pp. 595–601.

Columbia University, "*Parametric Study of CHF Data, vol. 2: A Genealized Subchannel CHF Correlation for PWR and BWR Fuel Assemblies*", Electric Power Research Institute, Jan. 1983, NP–2068, vol. 2, Research Project 813, pp. S–4–S–5; 3–24–3–26.

Israel, et al., "*Critical Heat Flux Measurements in a 16–Rod Simulation of a BWR Fuel Assembly*", Journal of Heat Transfer, Aug. 1969, pp. 355–363.

Marstrand, "*On Fuel Assemblies with Deflectors for Steam–Water Separation for Boiling–Water Reactors*", Danish Atomic Energy Commission Research Establishment Risö, Jul., 1971, pp. 6–23, 67.

\* cited by examiner

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
ARE PRINTED HEREIN.

Column 4, lines 24–45:

In a fuel bundle for use in the core of a boiling water nuclear reactor, part length rods having a tendency to reduce pressure drop are used in combination with spacers and spacer attached devices tending to restore pressure drop to improve critical power. The fuel bundle includes a preferred 9 by 9 matrix of upstanding vertically disposed fuel rods surrounded by a fuel channel between upper and lower tie plates. The tie plates support the fuel rods and permit the entry of water coolant at the lower tie plate and the exit of water and generated steam at the upper tie plate. Part length rods are distributed in the fuel rod matrix and combined with [increased] *decreased* spacer pitch. The addition of the part length rods has the advantage of lowering the pressure drop. Spacer additions (such as the [increase] *decrease* in spacer pitch in the upper two phase region of the bundle) or spacer attachments (such as vanes and especially so-called swirl vanes) are utilized to restore the pressure drop removed by the insertion of the part length rods. There results a serendipitous improved critical power performance in the upper two phase region of the fuel assembly.

Column 4, line 67 through column 5, line 7:

Alternately, and in addition to the disclosed decrease in spacer pitch, spacers incorporating vanes can be used. By way of example, these vanes can be our preferred partial or complete swirl vane arrays. The vanes are incorporated to the spacers in the interstitial volumes between the fuel rods. Such spacers, although increasing pressure drop, cause improvement in critical power. In the case of the incorporation of vanes to the spacer, [increased] *decreased* pitch of spacers is not required.

Column 6, lines 45–54:

A further object of this invention is to set forth preferable spacer attached devices for the increase of critical power through increased pressure drop. By way of example, either [increased] *decreased* spacer pitch or the addition of vanes, such as swirl vanes can be used. In either case, the decrease in critical power due to the presence of the part length rods is considerably less than the increase in critical power due to spacers causing the recaptured pressure drop. As a result, overall critical power is improved.

Column 10, line 67 through column 11, line 11:

It has been found in addition to the [increased] *decreased* spacer pitch, that spacers incorporating swirl vane constructions in the upper two phase region of the fuel bundle in conjunction with partial length rods have the same overall beneficial effect. Specifically, critical power is increased even though the insertion of the spacers having the swirl vanes tends to restore some—if not all—of the improved pressure drop in the upper two phase region of the fuel bundle. Accordingly, the following constructions are exemplary of spacers which when left on a regular pitch through the incorporation of swirl vanes produce an increased critical power phenomenon.

Column 12, lines 4–12:

It is important to note that we use the [increased] *decreased* spacer pitch or the swirl vanes attached to the spacer in combination with the two phase flow at the top of the fuel bundle. We rely on the effect of the spacer co-acting with the flow after it has passed through the spacer. This "downstream flow" occurs upwardly from the spacers after the two phase flow has passed over one of the spacers. This effect is important with respect to spacers S7 (FIGS. 3B–3F), spacer $S_6$ and S5.

Column 12, lines 16–27:

It is not required that the top most spacer S7 in FIG. 3A or spacer S8 in FIG. 3B–3F be either a ferrule type spacer or have swirl vanes attached. In most fuel loadings, the kilowatt output per foot above the top most spacer is not at a level where transition boiling leading to adverse critical power ratios can occur. Consequently, an inconel spacer having low pressure drop with higher neutron absorption can be successfully used at this location. This upper spacer need not incorporate the [increased] *decreased* spacer pitch or the disclosed swirl vanes.

AS A RESULT OF REEXAMINATION, IT HAS BEEN DETERMINED THAT:

Claims 1–109 are cancelled.

* * * * *